United States Patent [19]
Terajima

[11] Patent Number: 5,554,904
[45] Date of Patent: Sep. 10, 1996

[54] VIBRATION CONTROL APPARATUS HAVING AUTOMATIC GAIN CONTROL

[75] Inventor: Kokichi Terajima, Tokyo, Japan

[73] Assignee: Akai Electric Co., Ltd., Tokyo, Japan

[21] Appl. No.: 371,031

[22] Filed: Jan. 10, 1995

[30] Foreign Application Priority Data

Jul. 5, 1994 [JP] Japan ..................................... 6-153953
Jul. 20, 1994 [JP] Japan ..................................... 6-168142

[51] Int. Cl.$^6$ ............................................... H01L 41/107
[52] U.S. Cl. ........................... 310/316; 310/315; 310/317; 310/318
[58] Field of Search ...................... 310/315–319

[56] References Cited

U.S. PATENT DOCUMENTS

| | | | |
|---|---|---|---|
| 4,479,098 | 10/1984 | Watson ..................................... | 310/318 |
| 4,714,846 | 12/1987 | Pesque et al. ........................... | 310/317 |
| 5,349,857 | 9/1994 | Kasanami et al. ....................... | 310/316 |
| 5,426,970 | 6/1995 | Florida et al. ........................... | 310/316 |
| 5,434,467 | 7/1995 | Abe et al. ................................ | 310/316 |

FOREIGN PATENT DOCUMENTS 0584798  3/1994  European Pat. Off. ........ G01C 19/56

Primary Examiner—Thomas M. Dougherty
Attorney, Agent, or Firm—Meltzer, Lippe, Goldstein, et al.

[57] ABSTRACT

A vibration control apparatus that can impart stabilized self-induced vibration without amplitude changes even under changes in ambient temperature is disclosed. When the apparatus is used with a vibrating gyroscope, detection accuracy is increased without temperature dependence of detection sensitivity on input angular velocity. The vibration control apparatus imparts self-induced vibration to a vibrator which has a pair of piezo-electric elements on the side surface of a vibration member having a resonance point. The vibrator is given self-induced vibration while the combined current value of the respective currents flowing through the pair of piezo-electric elements is held fixed. A drive signal output circuit outputs a drive signal applied to the pair of piezoelectric elements and has a voltage gain with a temperature dependence corresponding to the temperature dependencies of the equivalent resistances of the vibrator. The automatic gain control circuit holds the combined current value of the currents flowing through the pair of piezo-electric elements fixed. The drive signal output circuit may have a voltage gain contrary to the temperature dependencies of equivalent resistances of the vibrator.

18 Claims, 20 Drawing Sheets

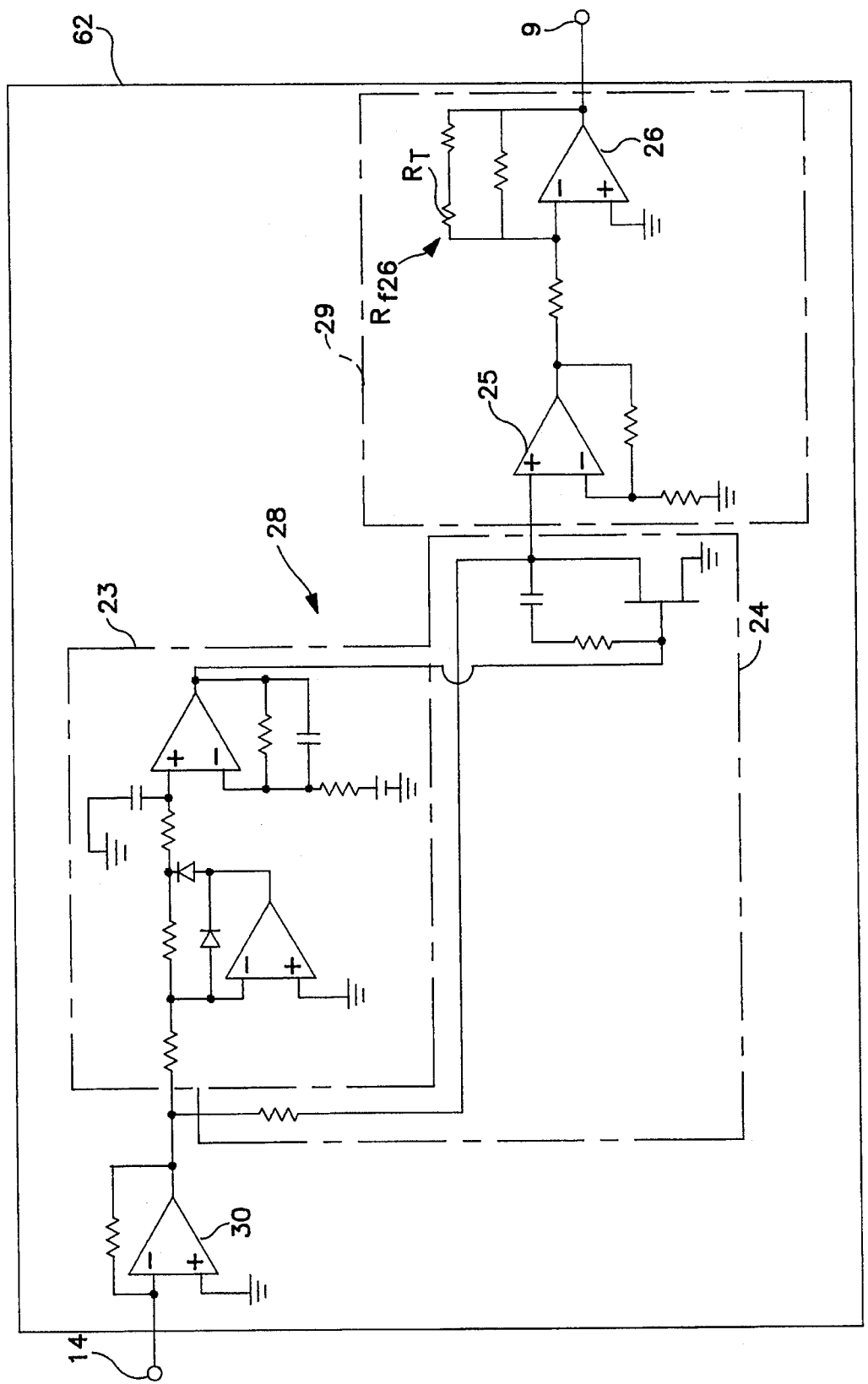
FIG. IOB

VIBRATION CONTROL APPARATUS HAVING AUTOMATIC GAIN CONTROL

The following related patent applications have been filed concurrently in the United States Patent and Trademark office and are hereby incorporated by reference:

VIBRATION CONTROL DEVICE FOR SAFELY INDUCED VIBRATION OF GYROSCOPES to K. Terajima, claiming priority of Japanese Patent Application Nos.: 6-2364, 6-157493, 6-10348 and 6-168141;

ANGULAR VELOCITY DETECTION CIRCUIT FOR VIBRATORY GYROSCOPES to K. Terajima et al., claiming priority of Japanese Patent Application Nos.: 6-50103; and VIBRATION CONTROL APPARATUS HAVING OSCILLATION FREQUENCY REGULATION, to K. Terajima, claiming priority of Japanese Patent Applications: 6-205405 and 6-188403.

FIELD OF INDUSTRIAL UTILIZATION

This invention relates to a vibration control apparatus used in a piezo-electric type vibrating gyroscope, and particularly to a vibration control apparatus having stabilized detection sensitivity for angular velocity in a wide range of temperatures and an automatic gain control circuit.

BACKGROUND OF THE INVENTION

An example of a conventional vibrating gyroscope is illustrated in FIG. 13. In this vibrating gyroscope, the vibrator 4 has piezo-electric elements 2 and 3 which are respectively connected via the respective impedance elements Z1 and Z2 to the output side of drive apparatus 6. The output side of this drive apparatus 6 is connected via another impedance element Z3 to capacitor element C. Therefore, drive signals from the drive apparatus 6 are simultaneously applied to the piezo-electric elements 2 and 3 and to capacitor element C.

The outputs at the respective nodes of the impedance elements Z1 and Z2 and the piezo-electric elements 2 and 3 are combined. This combined output and the output at the node of impedance element Z3 and capacitor element C are supplied to differential amplifier 7. The output from the differential amplifier 7 is fed back to the drive apparatus 6 so that the vibrator 4 is self-vibrating. Additionally, the outputs at the respective nodes of impedance elements Z1 and Z2 and piezo-electric elements 2 and 3 are supplied to another differential amplifier 8, so as to obtain an angular velocity detection signal based on the output from differential amplifier 8.

An example of a vibrator 4, shown in FIG. 14, has a square cross-sectional shape and has piezo-electric element 2 on one side surface 1a of vibration member 1 having a resonance point and piezo-electric element 3 on another side surface 1b adjoining side surface 1a. Another example of a vibrator 4, shown in FIG. 15, has piezo-electric elements 2 and 3 split in the wide direction on the same side of vibration member 1. Another example of a vibrator 4, shown in FIG. 16, has piezo-electric elements 2 and 3 on opposite sides of vibration member 1. Another example of a vibrator 4, shown in FIG. 17, has the respective piezo-electric elements 2a and 2b on opposite side surfaces of vibration member 1 and connects them in parallel so that they act essentially as one piezo-electric element 2, and has respective piezo-electric elements 3a and 3b on the other opposite sides and connects them in parallel so that they act essentially as one piezo-electric element 3.

Still another example of a vibrator 4, shown in FIG. 18, has a triangular cross-sectional shape and has piezo-electric elements 2 and 3 on two side surfaces of vibration member 1 having a resonance point. Another example of a vibrator 4, shown in FIG. 19, has a circular cross-sectional shape and has piezo-electric elements 2 and 3 on the peripheral surface of vibrator member 1 having a resonance point. Thus, in all these examples, at least two piezo-electric elements are formed on the side surfaces of vibration members having various sectional shapes. FIG. 20 shows an equivalent circuit for a single piezo-electric element for the vibrators shown in FIGS. 14 to 19, which is represented as a parallel resonance circuit with damping capacity Cd connected in parallel to a series resonance circuit comprising an inductor L1, a capacitor C1 and a resistance R1. Further, the vibrators comprising two piezo-electric elements 2 and 3 in vibration member 1 are represented equivalently in FIG. 21.

The conventional vibration gyroscope shown in FIG. 13 applies the drive signals from drive apparatus 6 to piezo-electric elements 2 and 3 via impedance elements Z1 and Z2. This causes the signal applied to piezo-electric elements 2 and 3 to decrease when the impedances of piezo-electric elements 2 and 3 drop in the vicinity of mechanical series resonance frequency $f_s$ in vibrator 4. The frequency at which the output from differential amplifier 7 is maximized and the mechanical series resonance frequency $f_s$ do not coincide.

In order to overcome such problems, the present applicant has already proposed, in Japanese Patent Application Hei 6-2364 and Japanese Patent Application Hei 6-10348, a vibration control apparatus that can impart self-induced vibration by stabilizing the vibrator at a frequency set to the mechanical series resonance frequency $f_s$ of the vibrator. In other words, the vibrator oscillates at or near its resonant frequency. When used with a vibrating gyroscope, the apparatus can also effectively decrease formation of low voltage and variations in voltage.

FIG. 22 illustrates an example of a vibration control apparatus in the above patent applications of the applicant. This vibration control apparatus is one that controls vibrations in a vibrator 4, as shown in FIGS. 14 through 19. As discussed above, such a vibrator 4 comprises at least one pair of piezo-electric elements 2 and 3 on the side surfaces of vibration members 1 having varying cross-sectional shapes and resonance points. Signal output terminal 9 of drive apparatus 6 is respectively connected to signal input terminals 11L and 11R of feedback amplifier 10L having feedback resistance $R_{fL}$ and feedback amplifier 10R having feedback resistance $R_{fR}$. Feedback input terminals 12L and 12R of the feedback amplifiers 10L and 10R are respectively connected to one of the electrodes of piezo-electric elements 2 and 3, so as to apply the drive signal to the vibrator. The other electrodes of piezo-electric elements 2 and 3 are connected via capacitor Cc to compensation signal output terminal 13 of drive apparatus 6 which outputs a compensation signal for the damping capacity of vibrator 4, so that the compensation signal is combined with signals of the other electrodes of piezo-electric elements 2 and 3. This combined output signal is amplified by integrating amplifier 17. The signal output terminal 18 is connected to the input terminal 14 of the drive apparatus 6, so that the vibrator 4 is given self-induced vibration.

The output of integrating amplifier 17 and the drive signal at signal output terminal 9 are supplied to the differential amplifier 22 and differentially amplified. The output of the differential amplifier 22 is supplied via variable resistance VR to feedback input terminals 12L and 12R of feedback amplifiers 10L and 10R supply current at these input terminals. The currents vary depending on the current values flowing in the equivalent resistances of piezo-electric elements 2 and 3, i.e., depending on the temperature dependencies. The outputs of the feedback amplifiers 10L and 10R are supplied to differential amplifier 20, so that the Coriolis force arising from the angular velocity acting on vibrator 4 can be detected as voltage. Further, the respective feedback resistances $Rf_L$ and $Rf_R$ are connected between the output sides of feedback amplifiers 10L and 10R and the corresponding feedback input terminals 12L and 12R sides.

FIG. 23 illustrates an example of the drive apparatus 6 having the compensation signal output terminal 13 as shown in FIG. 22. This drive apparatus 6 has a non-inverting amplifier 15 and an inverting amplifier 16. The signal from input terminal 14 is amplified at the non-inverting amplifier 15. The output from the non-inverting amplifier 15 is amplified at inverting amplifier 16 and then supplied to signal output terminal 9 as the drive signal. The output from the non-inverting amplifier 15 is also supplied to the signal output terminal 9 as a compensation signal. The drive signal and the compensation signal have a phase difference of 180°. The amplitude ratios of these signals are appropriately set by inverting amplifier 16.

With the vibration control apparatus illustrated in FIG. 22, the imaginary parts of the current flowing in piezo-electric elements 2 and 3, relative to the damping capacities Cd, are extinguished by the combined compensation signal via capacitor Cc. Therefore, the output of integrating amplifier 17 becomes only the real part of the current flowing in piezo-electric elements 2 and 3. Consequently, the voltage gain of integrating amplifier 17 maximizes at the mechanical series resonance frequency $f_s$ of vibrator 4, thereby, making it possible to impart self-induced vibration by stabilizing vibrator 4 at a frequency in accurate agreement with the mechanical series resonance frequency $f_s$. In other words, the vibrator oscillates at or near its resonant frequency. Also, the self-induced vibration at mechanical series resonance frequency $f_s$ uses a capacitor Cc having a temperature dependence corresponding to the temperature dependence of damping capacities Cd of vibrator 4, so that further stabilization becomes possible.

As described above, the self-induced vibration is provided by at least one pair of piezo-electric elements without providing an independent piezo-electric element to obtain feedback output. Therefore, fluctuations in amplitude that accompany characteristic differences in the piezo-electric elements themselves will not occur, as in cases where a feedback piezo-electric element for self-induced vibration is furnished separately from the drive piezo-electric element. However, the currents flowing through the pair of feedback piezo-electric elements 2 and 3 that form the vibrator 4 are determined by the impedance of vibrator 41 Therefore, when the equivalent resistances and damping capacity of the vibrator 4 change due to ambient temperature, the currents change also.

With the above vibration control apparatus, fluctuations in damping capacity due to temperature changes are compensated for by capacitor Cc. Fluctuations or variations in equivalent resistances due to temperature changes are compensated for by supplying the output of differential amplifier 22 to feedback input terminals 12L and 12R of feedback amplifiers 10L and 1OR via variable resistance VR. However, there is no control over the temperature changes in the combined currents flowing through piezo-electric elements 2 and 3. It is also difficult to completely compensate for these variations. Therefore, due to temperature changes, the amplitude of self-oscillating vibration in the vibrator 4 varies inversely to the equivalent resistances. The amplitude of the vibration corresponding to the input angular velocity also varies correspondingly in the direction of self-induced vibration and in the orthogonal direction, so that detection sensitivity varies and detection accuracy can end up declining.

SUMMARY OF THE INVENTION

An object of the present invention is to provide a vibration control apparatus which imparts stabilized self-induced vibration with no amplitude variations even under changes in ambient temperature. Consequently, when used with vibrating gyroscopes, the apparatus increases detection accuracy by eliminating the temperature dependence of input angular velocity detection sensitivity.

In a first embodiment of the invention, the vibration control apparatus has a drive apparatus with an automatic gain control circuit and a vibrator having at least one pair of piezo-electric elements on the side surface of a vibration member having a resonance point. The drive apparatus imparts self-induced vibration to the vibrator, while the combined current value of the respective currents flowing through the pair of piezo-electric elements is held fixed.

Since the combined current value of the currents passing through the pair of piezo-electric elements is held fixed, the equivalent resistances of the vibrator are apparently held fixed with no relation to ambient temperature changes. Consequently, the vibrator has self-induced vibration at a constantly fixed amplitude. When used with a vibrating gyroscope that detects angular velocity using the same pair of piezo-electric elements, there is an effective suppression of temperature-induced variations in amplitude of vibration relative to input angular velocity in the direction of self-induced vibration and the orthogonal direction.

In a second embodiment of the invention, the drive apparatus imparts self-induced vibration to the vibrator while the combined current value of currents flowing through the pair of piezo-electric elements from which combined currents corresponding to the damping capacity have been subtracted is held fixed.

Since the combined current value of currents flowing through the pair of piezo-electric elements from which current corresponding to the damping capacity has been subtracted, i.e., the real part of the current, is held fixed, the equivalent resistances of the vibrator are apparently also held fixed with no relation to ambient temperature changes. Consequently, the vibrator has more accurate self-induced vibration at a constantly fixed amplitude. Therefore, when used with a vibrating gyroscope that detects angular velocity by using the same pair of piezoelectric elements, the temperature-induced changes in vibration, which correspond to the input angular velocity in the self-induced vibration direction and in the orthogonal direction, are also suppressed with greater reliability.

In a third embodiment of the invention, the vibration control apparatus has a drive apparatus which imparts self-induced vibration to a vibrator having at least one pair of piezo-electric elements on the side surface of a vibration member having a resonance point. A drive signal output circuit outputs a drive signal which is applied to the pair of piezo-electric elements. The voltage gain of the drive signal output circuit has a temperature dependence corresponding to the temperature dependencies of the equivalent resistances of the vibrator. An automatic gain control circuit holds the combined current of the currents flowing through the pair of piezo-electric elements fixed.

Since the combined current value of the currents flowing through the pair of piezo-electric elements is held fixed by the automatic gain control circuit, stabilized self-induced vibration is imparted without variations in amplitude. The voltage gain of the drive signal output circuit has a temperature dependence corresponding to the temperature dependence of the equivalent resistances of the vibrator, so that even under variations in ambient temperature, variations in current flowing through the equivalent resistances of the vibrator are controlled. Consequently, the control range of the automatic gain control circuit is reduced and it is possible to broaden its operational range substantially.

In a fourth embodiment of the invention, the drive signal output circuit has a voltage gain with a temperature dependence contrary to the temperature dependencies of the equivalent resistances of the vibrator. The automatic gain control circuit holds the combined current of the currents flowing through the pair of piezo-electric elements, with current corresponding to the damping capacity subtracted, fixed.

Since the combined current of the currents flowing through a pair of piezo-electric elements from which current corresponding to the damping capacity has been subtracted, i.e., the real part of the combined current, is held fixed by the automatic gain control circuit, stabilized self-induced vibration is imparted without variations in amplitude. The voltage gain of the drive signal output circuit that outputs the drive signal applied to the pair of piezo-electric elements has a temperature dependence that does not correspond to the temperature dependence of the damping capacity of the vibrator. Therefore, even under variations in ambient temperature, variations in current flowing through the equivalent resistances of the vibrator are controlled. Consequently, the control range of the automatic gain control circuit is reduced and it is possible to broaden its operational range substantially.

Current flowing through the piezo-electric elements varies depending on variations in the equivalent resistance values and damping capacity values of the vibrator. When imparting self-induced vibration to the vibrator by the pair of piezoelectric elements themselves, no variations in amplitude accompany the characteristic differences in the piezo-electric elements for drive and feedback, as in the case of self-induced vibration using respectively separate piezo-electric elements for drive and feedback. Therefore, the amplitude of self-induced vibration of the vibrator varies with the equivalent resistances and inverse numbers. Furthermore, when detecting angular velocity by using the same pair of piezo-electric elements, the detection sensitivity for angular velocity is determined by the amplitude of vibration in the self-induced vibration direction and in the orthogonal direction. However, in this case variations in these vibrations relate to the same pair of piezo-electric elements, so that when one amplitude direction is held fixed, the other orthogonal direction is also held fixed. Consequently, when the equivalent resistances of the vibrator are controlled so as to be held apparently fixed, it is also possible to hold the detection sensitivity for angular velocity fixed.

The temperature dependencies of the equivalent resistances and damping capacity of the vibrator, as shown for example in FIG. 24, ordinarily have a tendency to be different, so that the temperature dependencies of the currents flowing in the equivalent resistance side and the damping capacity side of the vibrator have a tendency to be similar. Consequently, when the voltage gain of the drive signal output circuit has a temperature dependence differing from the temperature dependence of the damping capacity of the vibrator, the current flowing in the damping capacity side always has the same amplitude as the current of the damping capacity. Since the temperature dependencies of the current values flowing in the equivalent resistance side and the damping capacity side of the vibrator have a tendency to be similar, variations in current flowing in the equivalent resistances of the vibrator are suppressed. Consequently, the control range of the automatic gain control circuit is reduced and its operational range is broadened substantially.

BRIEF DESCRIPTION OF THE DRAWINGS

FIG. 10B illustrates an alternative example of the drive apparatus shown in FIG. 9.

DETAILED DESCRIPTION OF THE INVENTION

The invention will be explained by examples, with reference to the drawings.

Figure 1:
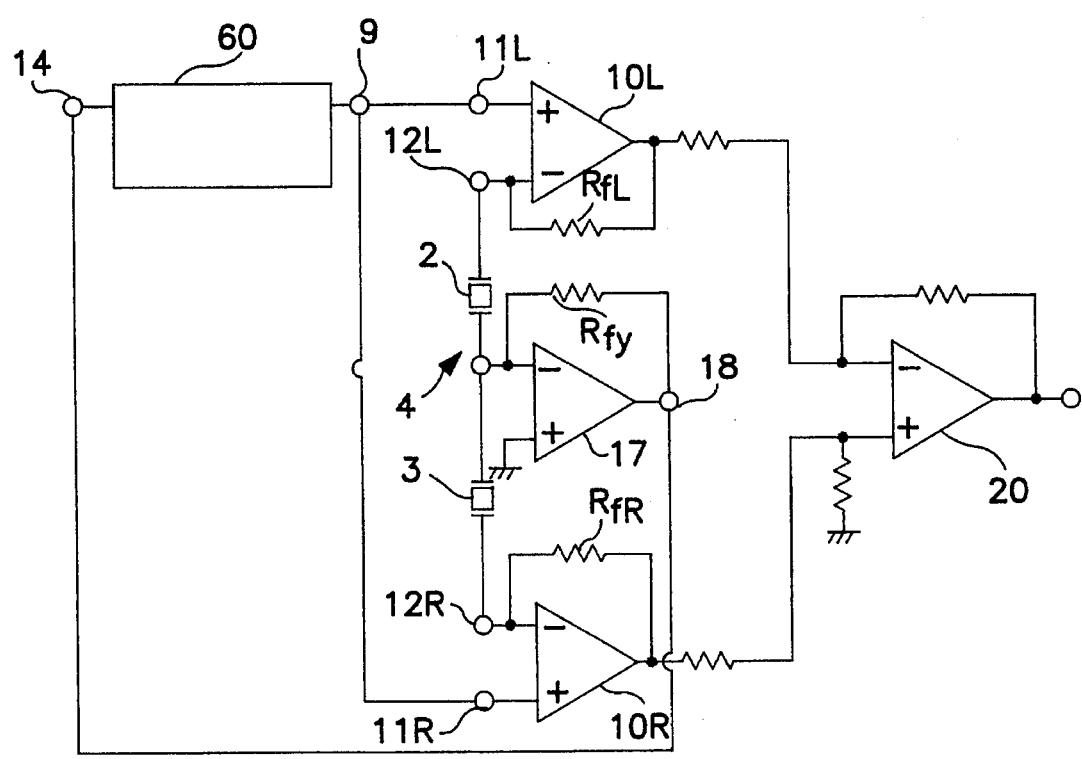
FIG. 1 illustrates a first example of the invention.

FIG. 1 illustrates an example of the invention, as used with a vibrating gyroscope that detects angular velocity. Examples of the vibrators 4 are illustrated in FIG. 14 through FIG. 19. These vibrators 4 are formed of at least two piezo-electric elements 2 and 3 on the side surfaces of vibration members 1 having various cross-sectional shapes and resonance points and are given self-induced vibration.

In FIG. 1, signal output terminal 9 of drive apparatus 60 is connected respectively to signal input terminals 11L and 11R of feedback amplifiers 10L and 10R. Feedback input terminals 12L and 12R of the feedback amplifiers 10L and 10R are respectively connected to one electrode each of piezo-electric elements 2 and 3. The other electrodes of piezo-electric elements 2 and 3 are connected to the inversion input terminal side of integrating amplifier 17 having feedback resistance Rfy, so that the voltage corresponding to the product of feedback resistance Rfy and the combined currents flowing through piezo-electric elements 2 and 3 are sent to output terminal 18. The output voltage from the output terminal 18 is sent to input terminal 14 of drive apparatus 60, so that vibrator 4 is given self-induced vibration. The outputs of feedback amplifiers 10L and 10R are supplied to differential amplifier 20, so that the Coriolis force arising from the angular velocity acting on vibrator 4 can be detected as voltage. Furthermore, feedback resistances $Rf_L$ and $Rf_R$ are respectively connected between the output side of each feedback amplifier 10L and 10R and the corresponding feedback input terminals 12L and 12R.

Figure 2A:
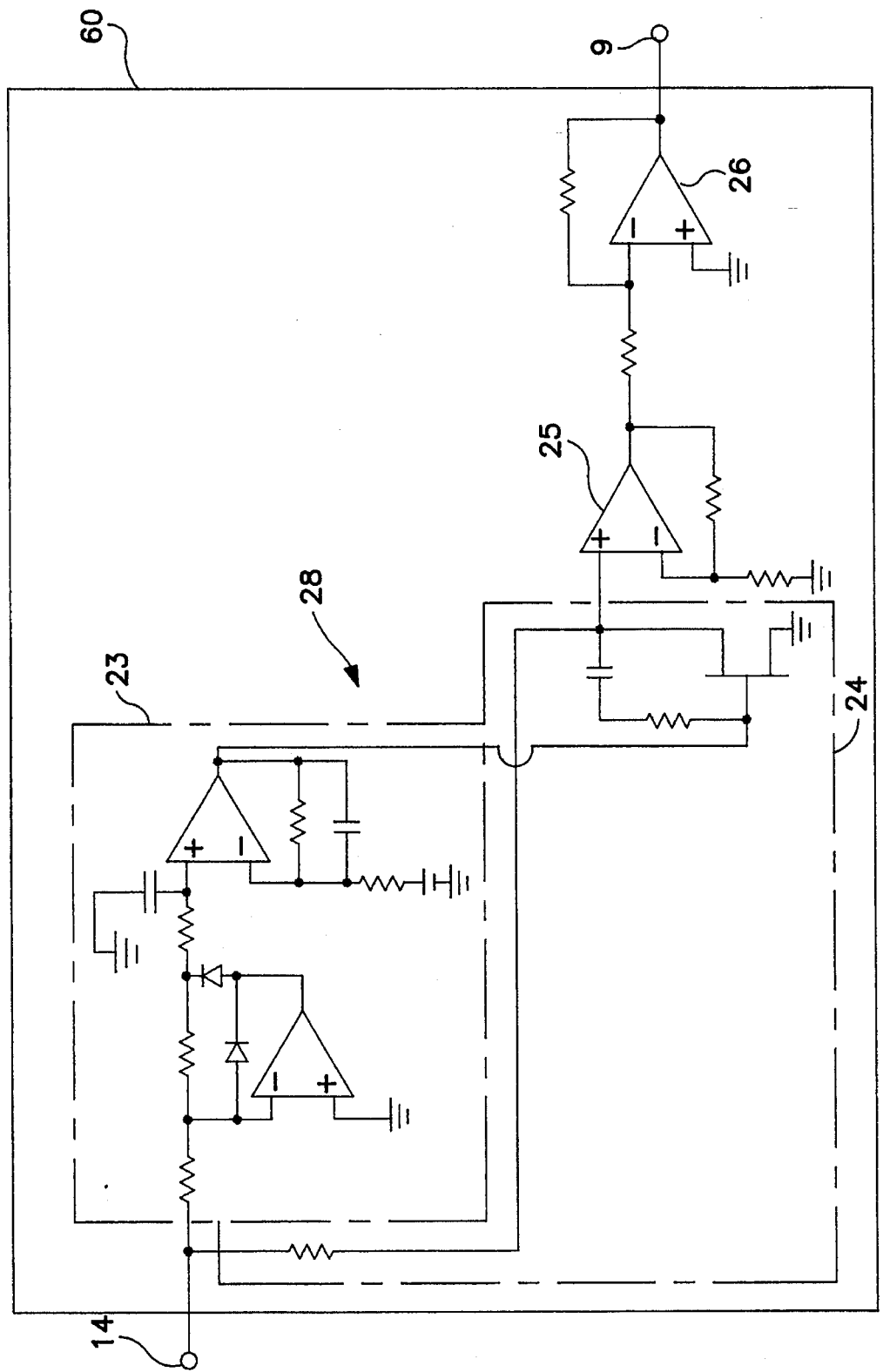
FIG. 2A illustrates an example of the drive apparatus in FIG. 1.

FIG. 2A illustrates an example of the drive apparatus 60 shown in FIG. 1. This drive apparatus 60 has an automatic gain control circuit 28 ("AGC circuit"), non-inverting amplifier 25 and inverting amplifier 26. The AGC circuit 28 has a comparator 23 and a vibration controller 24. At comparator 23 the input signal from input terminal 14 becomes direct current and is compared to a reference level. A direct current signal that corresponds to the comparison result is produced and supplied to vibration controller 24. Vibration controller 24 comprises, for example, an FET. An input signal from input terminal 14 is supplied to the source and drain paths of the FET. The output from comparator 23 is supplied to the gate of the FET to control the amplitude of the signal received from input terminal 14 based on the output of comparator 23. The AGC circuit 28 is not restricted to this example and can, for example, be constructed using an integrated multiplier.

The output of the AGC circuit 28 is amplified to a predetermined value by non-inverting amplifier 25 and, then inverted at inverting amplifier 26 and supplied to signal output terminal 9. The inverting amplifier 26 inverts the signal from the non-inverting amplifier 25 and inserts vibrator 4 into the positive feedback loop, as already proposed by the present applicant in Japanese Patent Disclosure Hei 5-113336, hereby incorporated by reference.

Figure 2B:
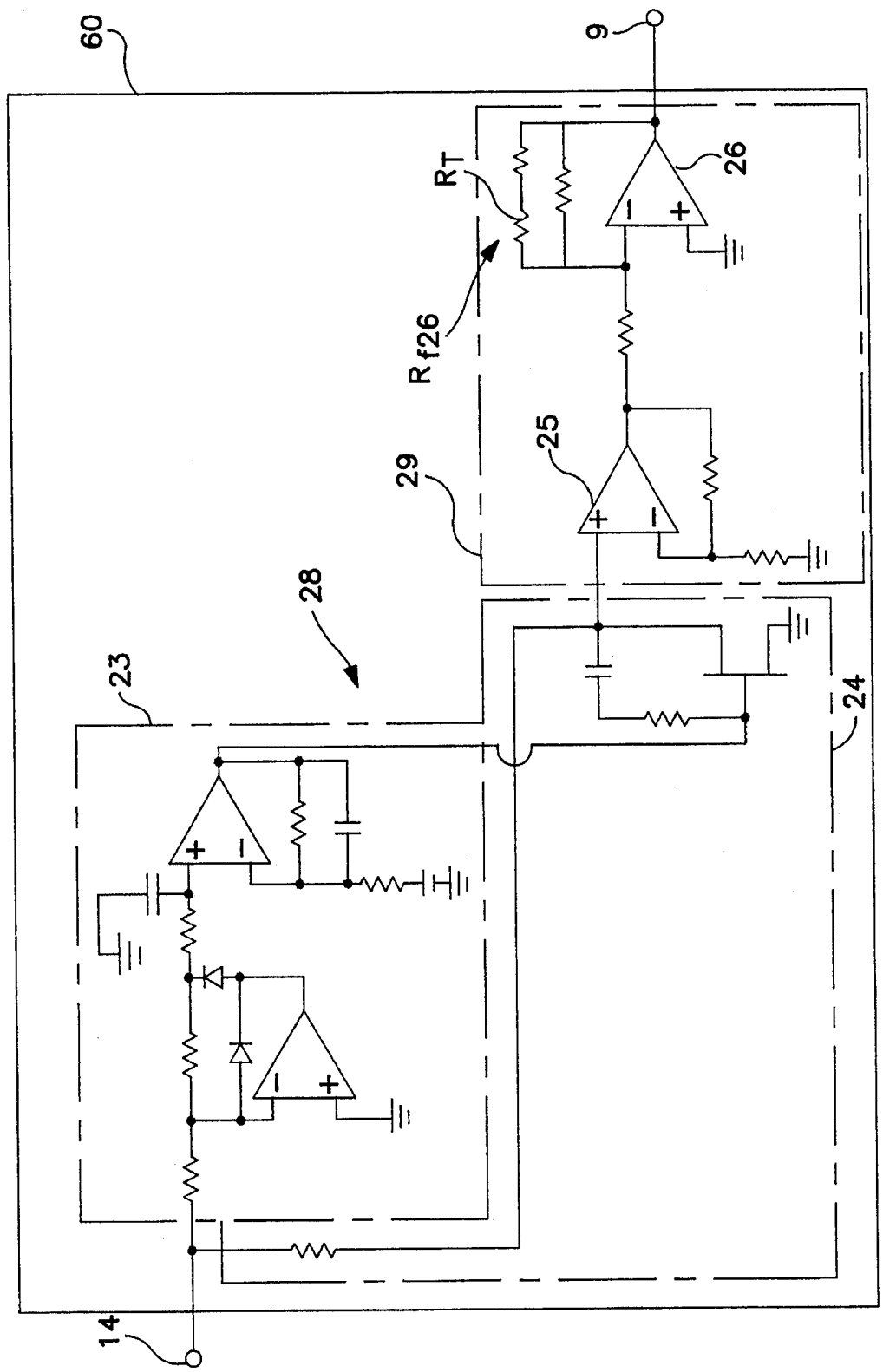
FIG. 2B illustrates an alternative example of the drive apparatus illustrated in FIG. 1.

As shown in FIG. 2B, the drive apparatus 60 may comprise a drive signal output circuit 29. Drive signal output circuit 29 has a non-inverting amplifier 25 and an inverting amplifier 26. The signal output from the amplification controller 24 of AGC circuit 28 is amplified to a predetermined value at non-inverting amplifier 25 and then inverted at inverting amplifier 26 and supplied to signal output terminal 9. The amplitude of the signal is controlled by the amplification controller 24. Further, the inverting amplifier 26 inverts the signal from non-inverting amplifier 25 and, as previously proposed by the applicant in Japanese Patent Disclosure Hei 5-11336, inserts vibrator 4 in the normal feedback loop.

Figure 24:
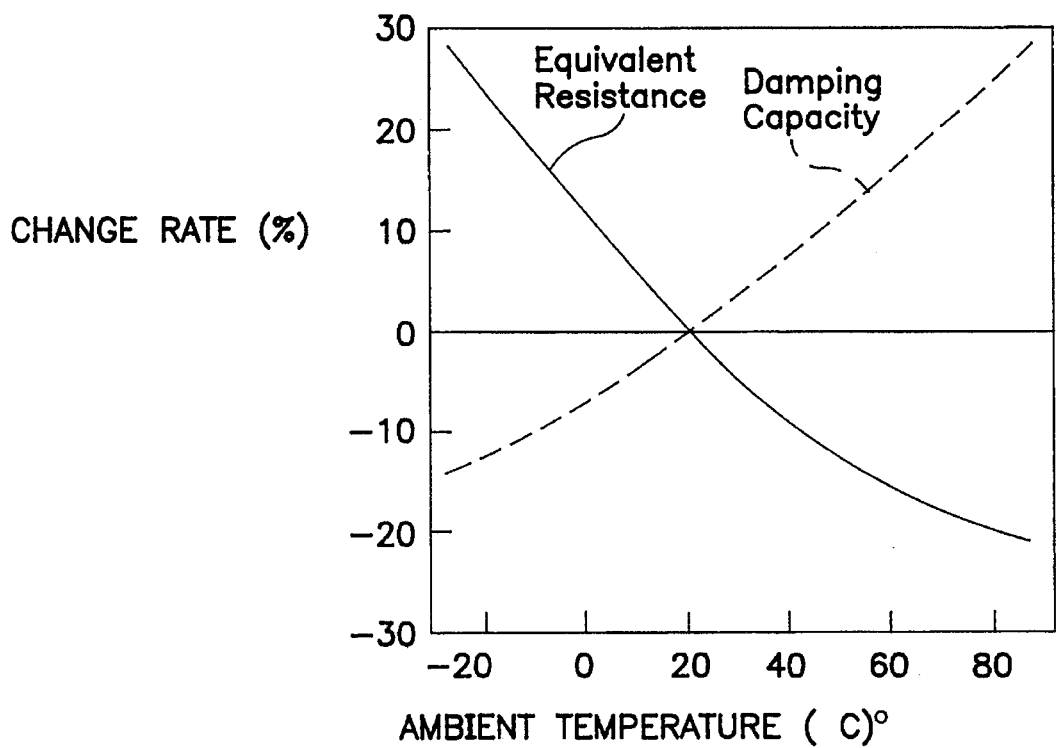
FIG. 24 illustrates the temperature dependence of the equivalent resistance and damping capacity of the vibrator.

In this example, the output of drive signal output circuit 29 varies according to the temperature dependencies of the equivalent resistances of vibrator 4. Therefore, the feedback resistance $Rf_{26}$ of inverting amplifier 26 contains a negative characteristic thermistor $R_T$ having the temperature dependence of the equivalent resistances of vibrator 4, for example, a temperature dependence corresponding to the temperature dependence of the equivalent resistance shown in FIG. 24.

When the equivalent resistances of piezo-electric elements 2 and 3 are increased or decreased by variations in the ambient temperature, the current flowing through piezo-electric elements 2 and 3 decreases or increases accordingly. Therefore, the level of the output signal of comparator 23 in drive apparatus 60 falls or rises. By these means, the resistance between the FET source and drain of amplitude controller 24 either increases or decreases, so that the size of the signal supplied to inverting amplifier 26 increases or decreases until the signal input to comparator 23 reaches a fixed value corresponding to the reference level.

Also, when the current flowing in piezo-electric elements 2 and 3 decreases or increases because of changes in ambient temperature, the voltage gain of inverting amplifier 26 simultaneously increases or decreases due to the temperature dependence of negative characteristic thermistor RT. As a result, the amount of decrease or increase in the current flowing through piezo-electric elements 2 and 3 are suppressed, and amplification changes in the signal supplied to input terminal 14 of drive apparatus 60 can be suppressed to a low degree.

Consequently, changes in the output of comparator 23 become small due to temperature changes. The amount of change in the resistance between the source and drain of the FET of amplitude controller 24 also becomes small. As a result, the changes in current become small over a wide range of temperatures, even under wide changes in the equivalent resistances of vibrator 4. It is possible to expand the operational range of AGC circuit 28 substantially.

In this manner, since the output voltage 6f cumulative amplifier 17, i.e., the combined current flowing through piezo-electric elements 2 and 3, is held fixed, the equivalent resistances of vibrator 4 in the self-induced vibration direction are apparently fixed. As a result, since the equivalent resistance to vibration in the sensitive direction of vibrator 4 formed of the same piezo-electric elements 2 and 3 is also apparently held fixed. The detection sensitivity for input angular velocity is fixed regardless of changes in ambient temperature, thereby making higher accuracy of detection possible.

Figure 3:
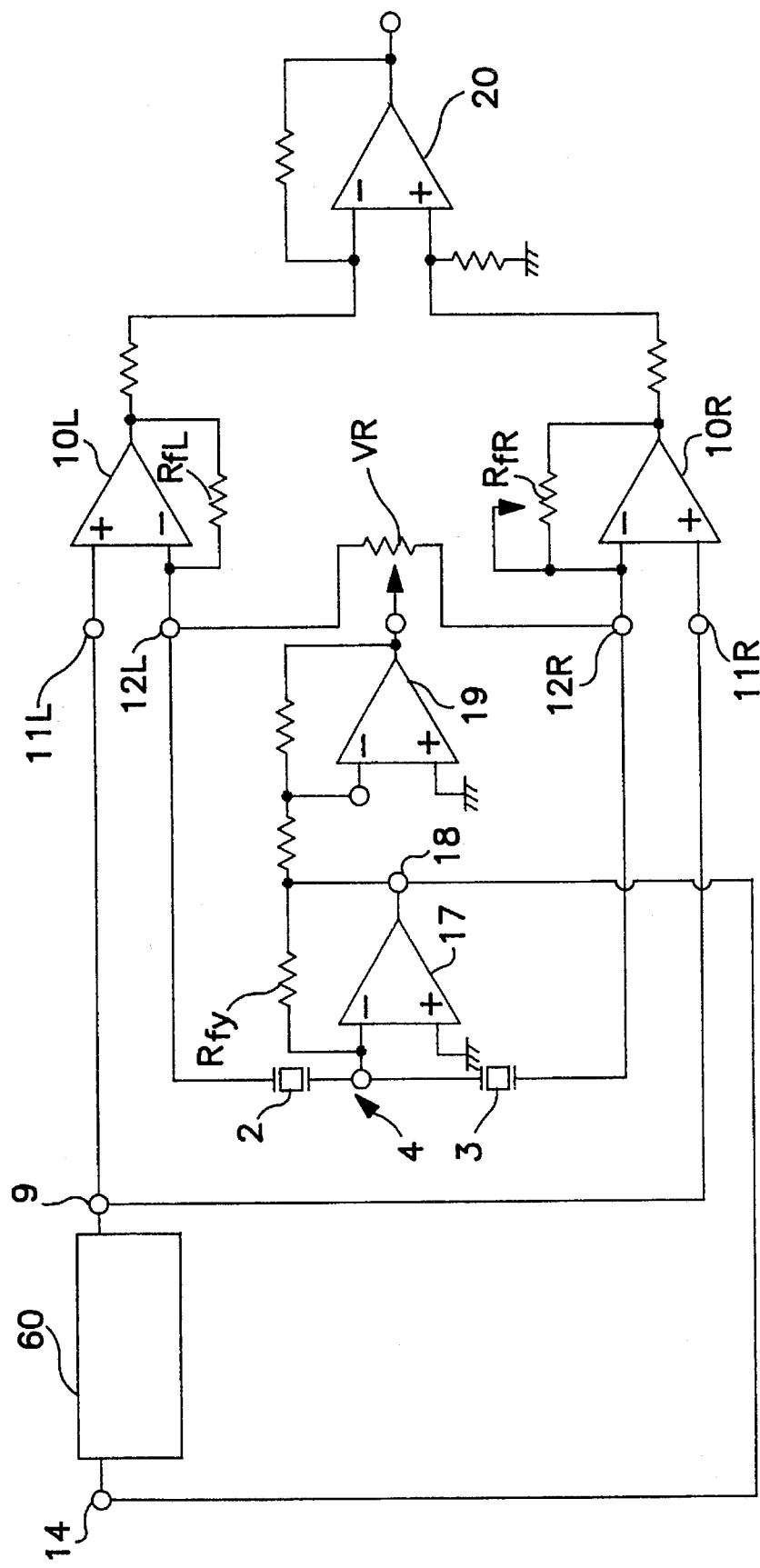
FIG. 3 illustrates a second example of the invention.

FIG. 3 illustrates a second example of the invention. In this embodiment, the output of integrating amplifier 17 at output terminal 18 is inversely amplified at inverting amplifier 19. In other words, the output of integrating amplifier 17 is inverted at inverting amplifier 19 and made in-phase with the drive signal. The output from inverting amplifier 19, i.e., a signal in-phase with the drive signal, is supplied via variable resistance VR to feedback input terminals 12L and 12R of feedback amplifiers 10L and 10R. This in-phase signal flows to feedback input terminals 12L and 12R after compensating for minute differences in the equivalent resistances of piezo-electric elements 2 and 3 with variable resistance VR. The remaining components are the same as in FIG. 1. At least one of the feedback resistances $Rf_L$ and $Rf_R$ of feedback amplifiers 10L and 10R (feedback resistance $Rf_R$ in this example) is a variable resistance.

In this example, minute differences in the equivalent resistances of piezo-electric elements 2 and 3 are compensated for by variable resistance VR. The real part of the current corresponding to the current flowing in the equivalent resistances of piezo-electric elements 2 and 3 flows into feedback input terminals 12L and 12R. The current flowing in feedback resistances $Rf_L$ and $Rf_R$ is made equal to the current of the damping capacity of piezo-electric elements 2 and 3. Minute differences in the damping capacity of piezo-electric elements 2 and 3 are compensated for by variable feedback resistance $Rf_F$, so that the respective products of the imaginary part of the current corresponding to the respective currents flowing in the damping capacity of piezo-electric elements 2 and 3 and the corresponding feedback resistance $Rf_L$ and variable feedback resistance $Rf_R$, i.e., the voltage of the imaginary part of the current, become equal.

When this is done, the current flowing into feedback input terminals 12L and 12R of feedback amplifiers 10L and 10R corresponds to the current flowing in the equivalent resistances of the respective piezo-electric elements 2 and 3 and varies in correspondence to their temperature dependencies. Therefore, only current corresponding to the Coriolis force flows in feedback resistances $Rf_L$ and $Rf_R$ of feedback amplifiers 10L and 10R. Consequently, formations of low voltage in feedback amplifiers 10L and 10R can be effectively decreased. Since the phase component corresponding to input angular velocity can also be effectively amplified, it becomes possible to detect angular velocity at higher accuracy in addition to the effect of Example 1.

Figure 4:
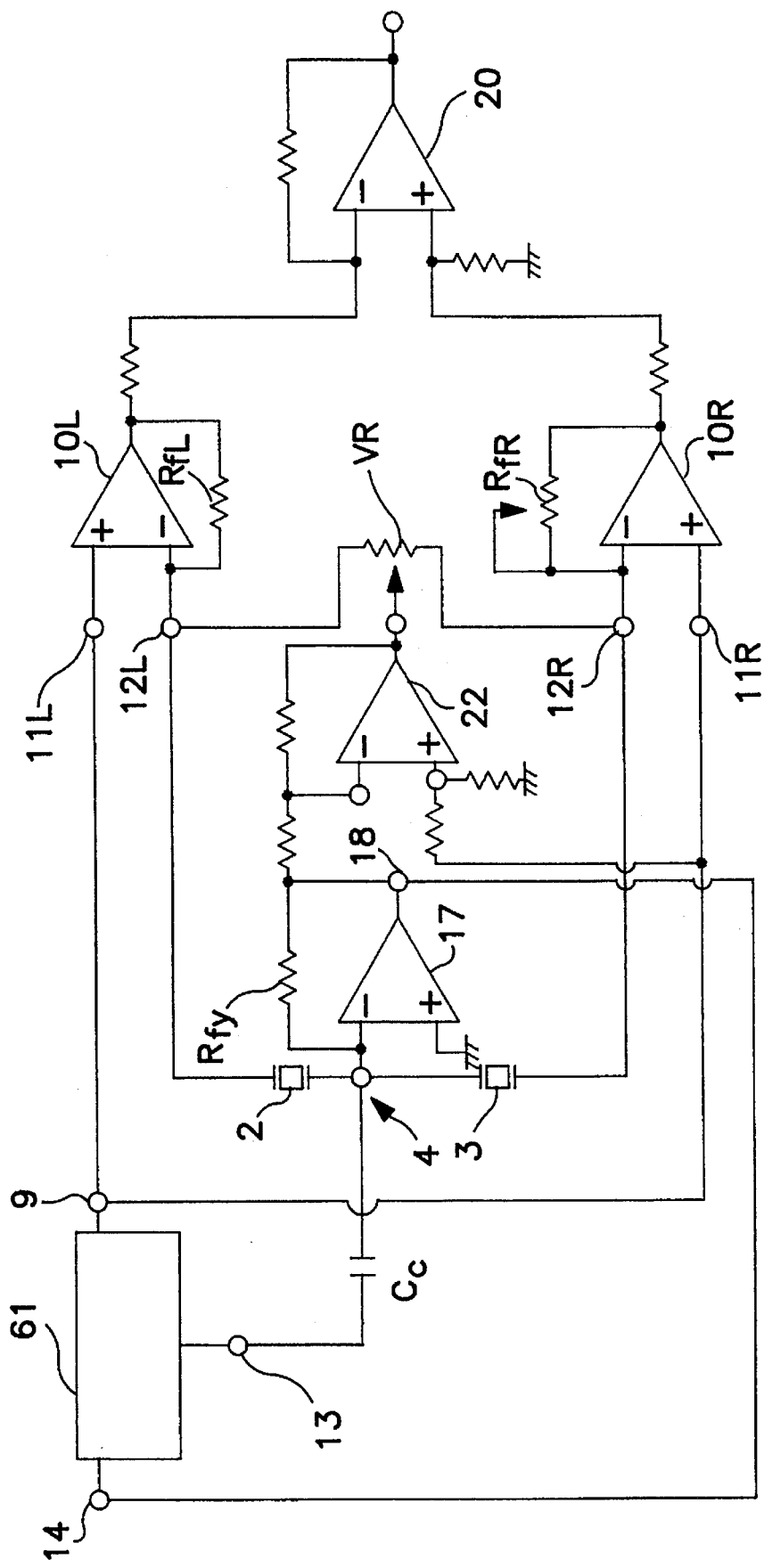
FIG. 4 illustrates a third example of the invention.

FIG. 4 illustrates Example 3 of the invention. The system of this example uses a drive apparatus 61 having a compensation signal output terminal 13 that outputs the compensation signal of the damping capacity of vibrator 4. This compensation signal is combined with the other electrode signals of piezo-electric elements 2 and 3 via capacitor Cc. The output of integrating amplifier 17 and the drive signal from drive apparatus 61 are supplied to differential amplifier 22 and differentially amplified. The output of differential amplifier 22 is supplied via variable amplifier VR to feedback input terminals 12L and 12R in the same manner as in FIG. 3.

Figure 5A:
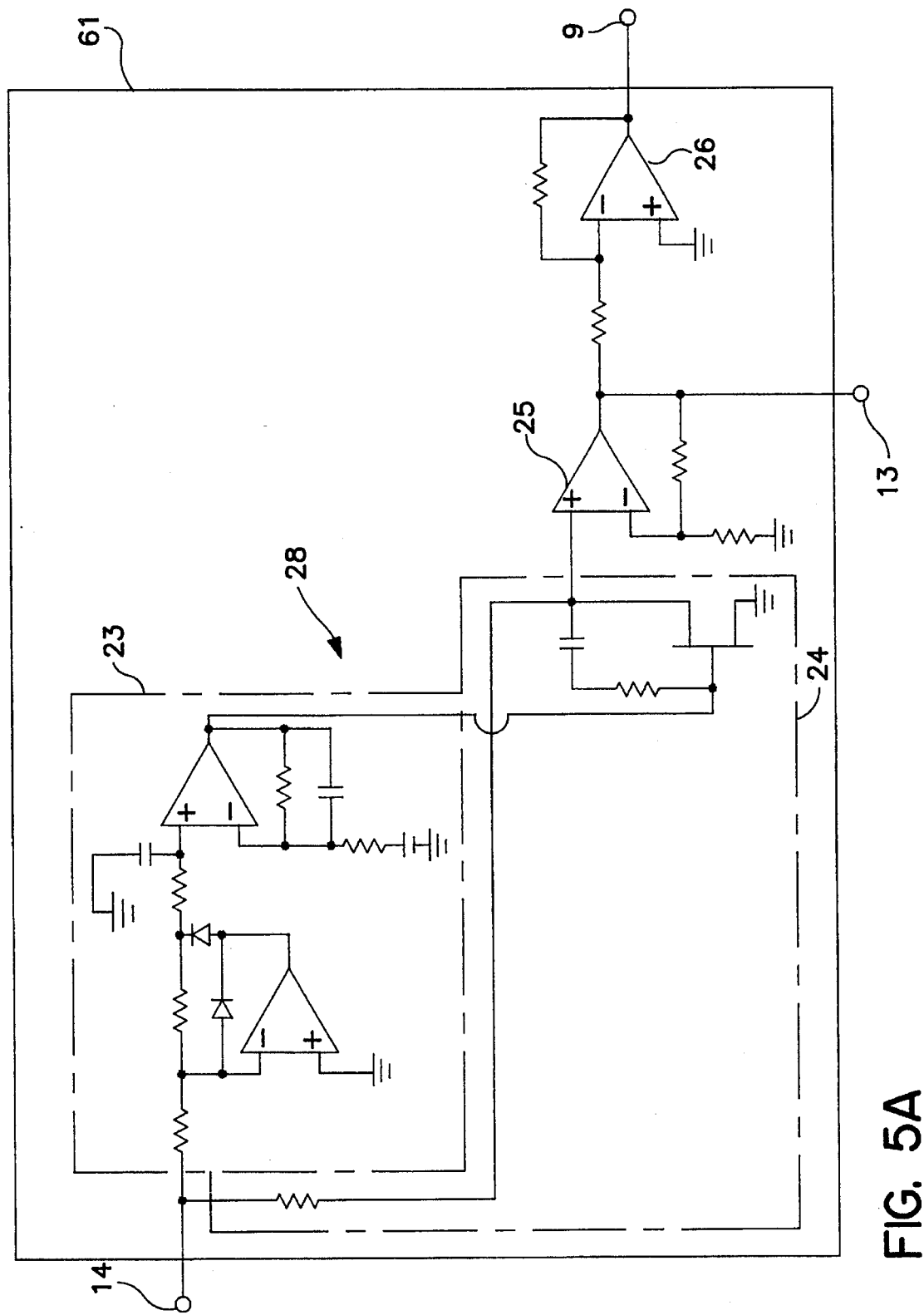
FIG. 5A illustrates an example of the drive apparatus shown in FIG. 4.

FIG. 5A illustrates an example of a drive apparatus 61 shown in FIG. 4. Besides supplying the output of non-inversion amplifier 25 to inverting amplifier 26, the drive apparatus 61 also supplies a compensation signal to compensation signal output terminal 13. The rest of this system is the same as FIG. 2. There is a 180° difference in phase between the drive signal output to signal output terminal 9 and the compensation signal output to compensation signal output terminal 13. Their amplitude ratio is appropriately set by inverting amplifier 26.

In this example, the imaginary parts of the currents flowing in piezo-electric elements 2 and 3, relative to the respective damping capacities Cd, are extinguished by the compensation signal supplied via capacitor Cc, so that the output of integrating amplifier 17 is only the real part of the currents flowing in piezo-electric elements 2 and 3. Consequently, the voltage gain of integrating amplifier 17 maximizes at the mechanical series resonance frequency $f_s$ of vibrator 4, so that it is possible to impart self-induced vibration to vibrator 4 by stabilizing it at a frequency in accurate agreement with the mechanical series resonance frequency $f_s$. In other words, the vibrator 4 oscillates at or near its resonant frequency. The self-induced vibration at the mechanical series resonance frequency $f_s$ can be made more stabilized by using a capacitor Cc having a temperature dependence corresponding to the temperature dependence of the damping capacities Cd of vibrator 4.

The output of integrating amplifier 17 is only the real part of the currents flowing in piezo-electric elements 2 and 3.

Therefore, when the equivalent resistances of piezo-electric elements 2 and 3 increase or decrease, the currents flowing through piezo-electric elements 2 and 3 decrease or increase correspondingly, so that the level of the output signal of comparator 23 in drive apparatus 61 falls or rises. Therefore, the resistance between the source and drain of the FET of vibration controller 24 increases or decreases, so that the size of the signal supplied to inverting amplifier 26 is increased or decreased until the signal input into comparator 23 reaches a fixed value corresponding to the reference level.

In this manner, the output voltage of integrating amplifier 17, i.e., the combined current flowing through piezo-electric elements 2 and 3 from which current corresponding to the damping capacity has been subtracted, is held fixed, so that the equivalent resistance of vibrator 4 in the self-induced vibration direction is apparently fixed. As a result, the equivalent resistance to vibration in the sensitivity direction of vibrator 4 formed by the same piezo-electric elements 2 and 3 is also apparently held fixed, so that the input angular velocity detection sensitivity becomes fixed regardless of changes in ambient temperature, thereby making highly accurate detection possible.

Figure 5B:
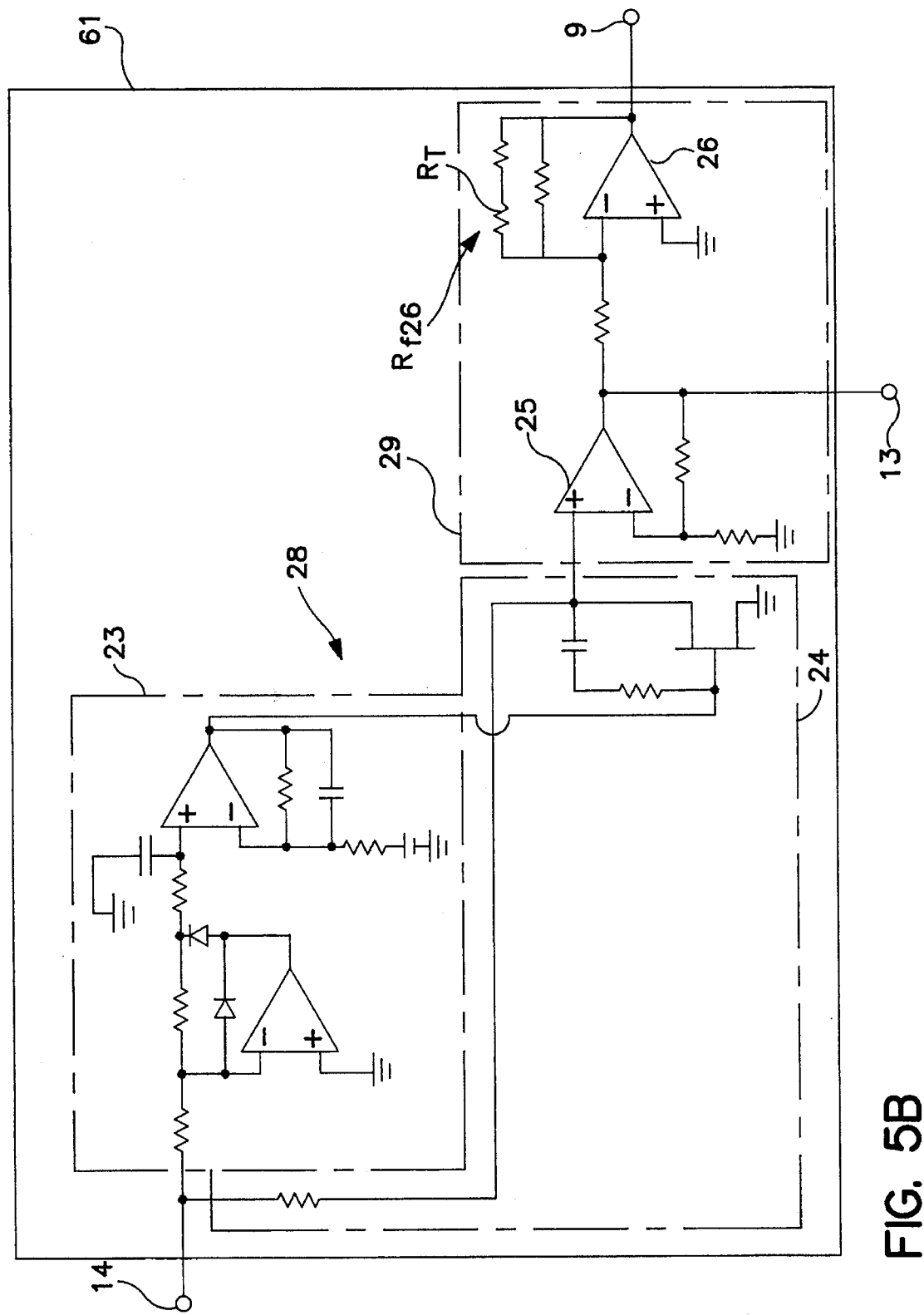
FIG. 5B illustrates an alternative example of the drive apparatus shown in FIG. 4.

An alternative example of a drive apparatus 61 for FIG. 4 is shown in FIG. 5B. Here, feedback resistance $Rf_{26}$ of inverting amplifier 26 has a negative characteristic thermistor $R_T$ which has a temperature dependence differing from the temperature dependence of the damping capacity of vibrator 4, so that the output of inverting amplifier 26 varies differently from the temperature dependence of the damping capacities of vibrator 4. For example, when the respective damping capacities of piezo-electric elements 2 and 3 increase or decrease because of changes in ambient temperature, the current flowing through the damping capacity sides of piezo-electric elements 2 and 3 increases or decreases accordingly, while the voltage gain of inverting amplifier 26 simultaneously decreases or increases. Consequently, the current flowing in the damping capacities of piezo-electric elements 2 and 3 becomes unequal to the current supplied from compensation signal output terminal 13 via capacitor Cc and is, therefore, extinguished.

Also, the temperature dependence of the currents respectively flowing through the equivalent resistance sides and damping capacity sides of vibrator 4 have similar tendencies, so that the amounts of increase or decrease in current flowing through the equivalent resistance sides are suppressed and amplitude changes in the signal supplied to input terminal 14 of drive apparatus 61 are also suppressed to a low degree. Consequently, changes in the output of comparator 23 caused by temperature changes become small, so that the amount of change in resistance between the source and drain of the FET of amplitude controller 24 becomes small. As a result changes in current become small even under wide changes in the equivalent resistances of vibrator 4 over a broad range, so that the operational range of AGC circuit 28 is substantially widened.

Also, the imaginary part of the current flowing in piezo-electric elements 2 and 3 is effectively extinguished by a compensation signal corresponding to the temperature dependence of the damping capacity, so that it is held apparently fixed even with regard to the equivalent resistance to vibration in the sensitivity direction of vibrator 4 having the same piezo-electric elements 2 and 3.

Consequently, the voltage gain of differential amplifier 17 maximizes at the mechanical series resonance frequency $f_s$ of vibrator 4. Since vibrator 4 is given self-induced vibration stabilized at a frequency in exact agreement with the mechanical series resonance frequency $f_s$, the detection sensitivity for input angular velocity becomes fixed regardless of ambient temperature changes, thus, making highly accurate detection possible.

Figure 6:
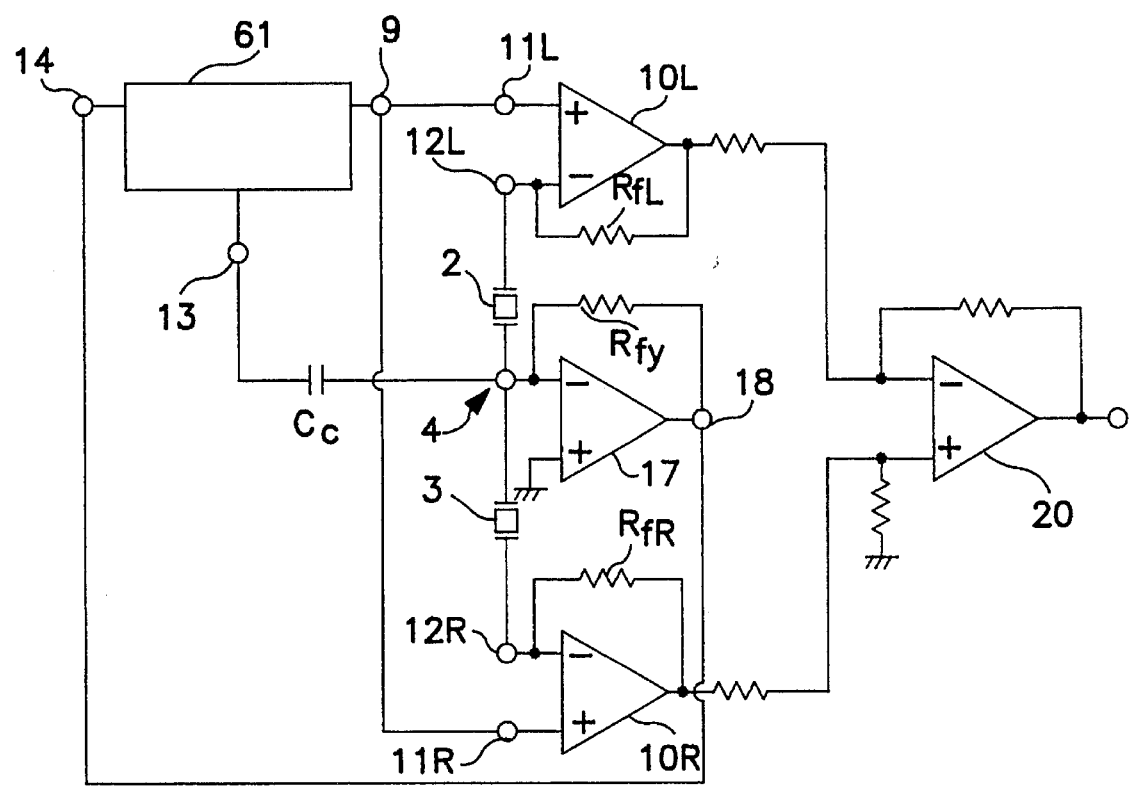
FIG. 6 illustrates a fourth example of the invention.

FIG. 6 illustrates Example 4 of the invention. This example is similar to FIG. 1 except that it replaces drive apparatus 60 with drive apparatus 61 having the compensation signal output terminal 13 as shown in FIGS. 5A or B. This compensation signal is combined with the signals of the electrodes on the other sides of piezo-electric elements 2 and 3 via capacitor Cc. Consequently, as in Example 3, the equivalent resistances for vibration in the sensitivity direction of vibrator 4 formed of the same piezo-electric elements 2 and 3 can be held apparently fixed. Therefore, detection sensitivity for input angular velocity can be fixed regardless of changes in ambient temperature, thereby making it possible to detect angular velocity at high accuracy.

Figure 7:
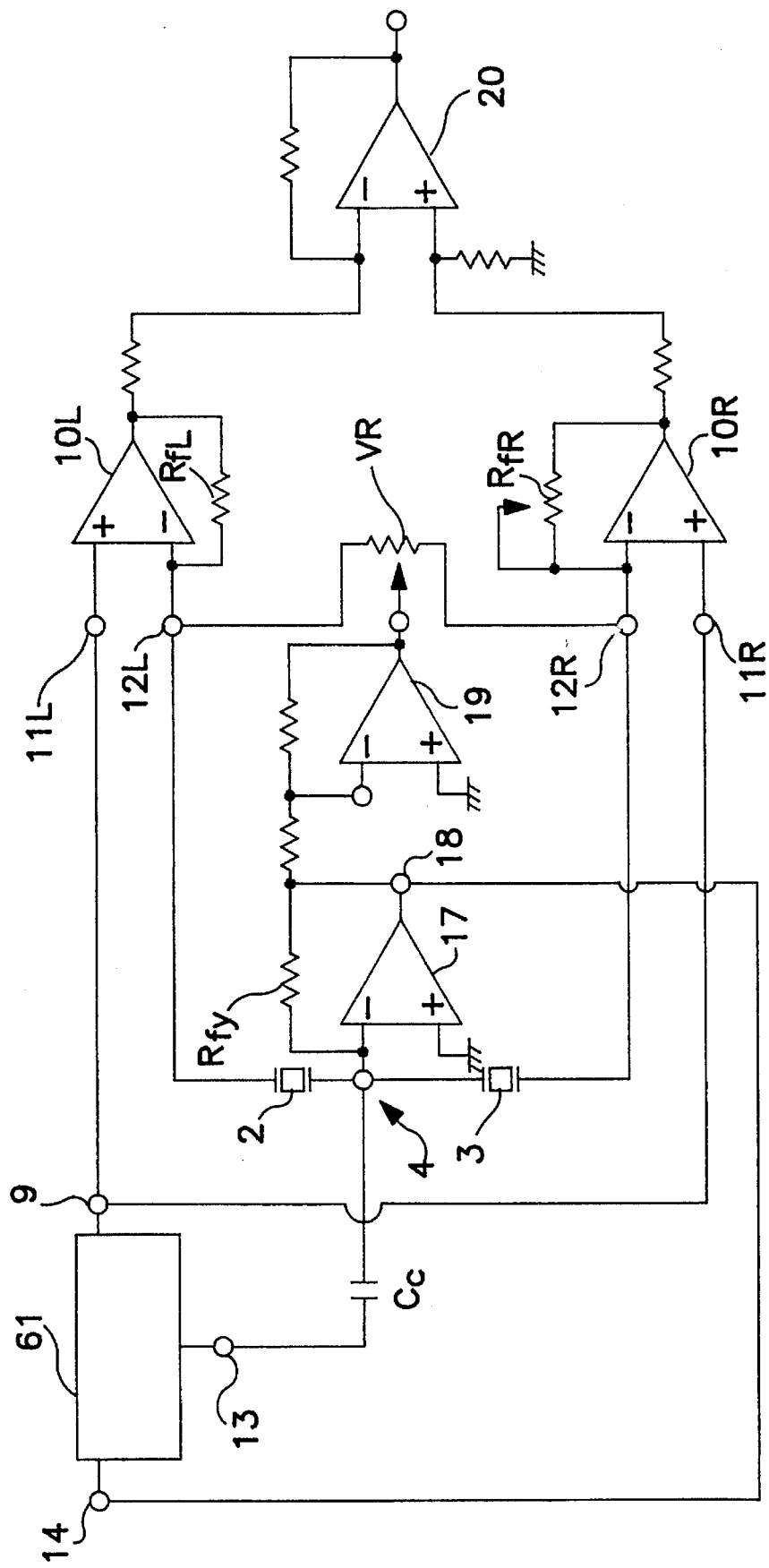
FIG. 7 illustrates a fifth example of the invention.

FIG. 7 illustrates Example 5 of the invention. This example is similar to FIG. 3 except that, instead of drive apparatus 60, it uses drive apparatus 61 having the compensation signal output terminal 13 as shown in FIGS. 5A or B. This compensation signal flows through capacitor Cc and combines with the signals of the other two electrodes of piezo-electric elements 2 and 3.

Consequently, in addition to the effect of Example 2, the equivalent resistances for vibration in the sensitivity direction of vibrator 4 formed of the same piezo-electric elements 2 and 3 can be held apparently fixed regardless of changes in ambient temperature. The detection sensitivity for input angular velocity can be fixed, so that it is possible to detect angular velocity at still higher accuracy.

Figure 8:
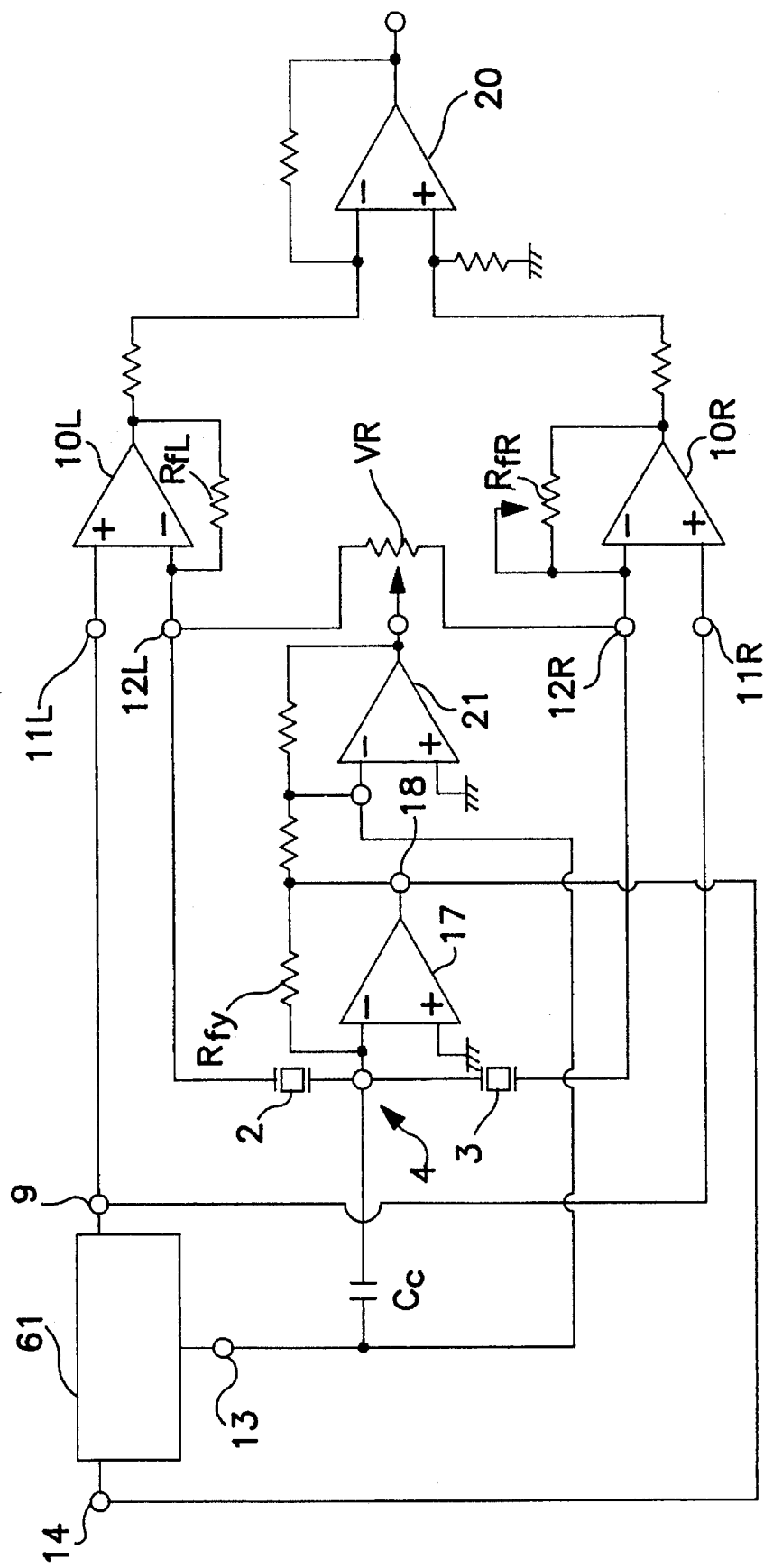
FIG. 8 illustrates a sixth example of the invention.

FIG. 8 illustrates Example 6 of the invention. This example is similar to FIG. 1 except that, instead of drive apparatus 60, it uses drive apparatus 61 having the compensation signal output terminal 13 as shown in FIGS. 5A and B. This compensation signal flows through capacitor Cc and combines with the signals of the other two electrodes of piezo-electric elements 2 and 3. The output of integrating amplifier 17 and the compensation signal are combined at integrating amplifier 21. The output of integrating amplifier 21 is supplied via variable resistance VR to feedback input terminals 12L and 12R, as in FIG. 3.

Consequently, as in Example 3, the equivalent resistances for vibration in the sensitivity direction of vibrator 4 formed of the same piezo-electric elements 2 and 3 can be held apparently fixed regardless of changes in ambient temperature, so that detection sensitivity for input angular velocity can be fixed. Minute differences in the equivalent resistances of piezo-electric elements 2 and 3 are compensated for by variable resistance VR as the combined signal output from amplifier 21 flows into feedback input terminals 12L and 12R. As a result, current flowing into feedback input terminals 12L and 12R varies in correspondence with the currents flowing in the equivalent resistances of piezo-electric elements 2 and 3 and with their temperature dependencies. Consequently, only currents that correspond accurately to the Coriolis force flow in feedback resistances $Rf_L$ and $Rf_R$ of feedback amplifiers 10L and 10R, so that formation of low voltage in feedback amplifiers 10L and 10R is decreased more effectively. The phase component for the input angular velocity can be amplified. It is also possible to fix the above described detection sensitivity and detect the angular velocity with still higher accuracy.

Figure 9:
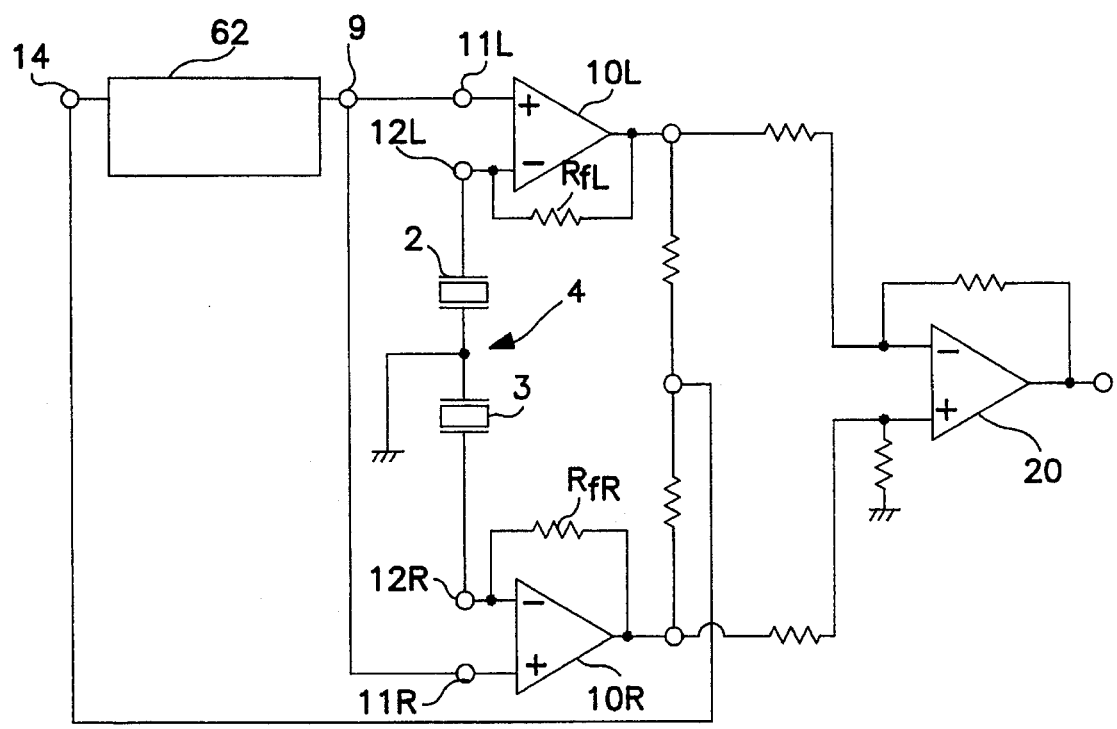
FIG. 9 illustrates a seventh example of the invention.

FIG. 9 illustrates Example 7 of the invention. In this example, signal output terminal 9 of drive apparatus 62 is respectively connected with signal input terminals 11L and 11R of feedback amplifiers 10L and 10R. The signal input terminals 11L and 11R of feedback amplifiers 10L and 10R are connected to the respective single electrodes of piezo-electric elements 2 and 3, so that the drive signal is applied to the vibrator. The other electrodes of piezo-electric elements 2 and 3 are grounded. The outputs of feedback amplifiers 10L and 10R are combined and supplied to input terminal 14 of drive apparatus 62 so as to impart self-induced vibration to vibrator 4, while the outputs of the feedback amplifiers 10L and 10R are supplied to differential amplifier 20 so that the Coriolis force arising from the angular vibration acting on vibrator 4 can be detected as voltage.

Figure 10A:
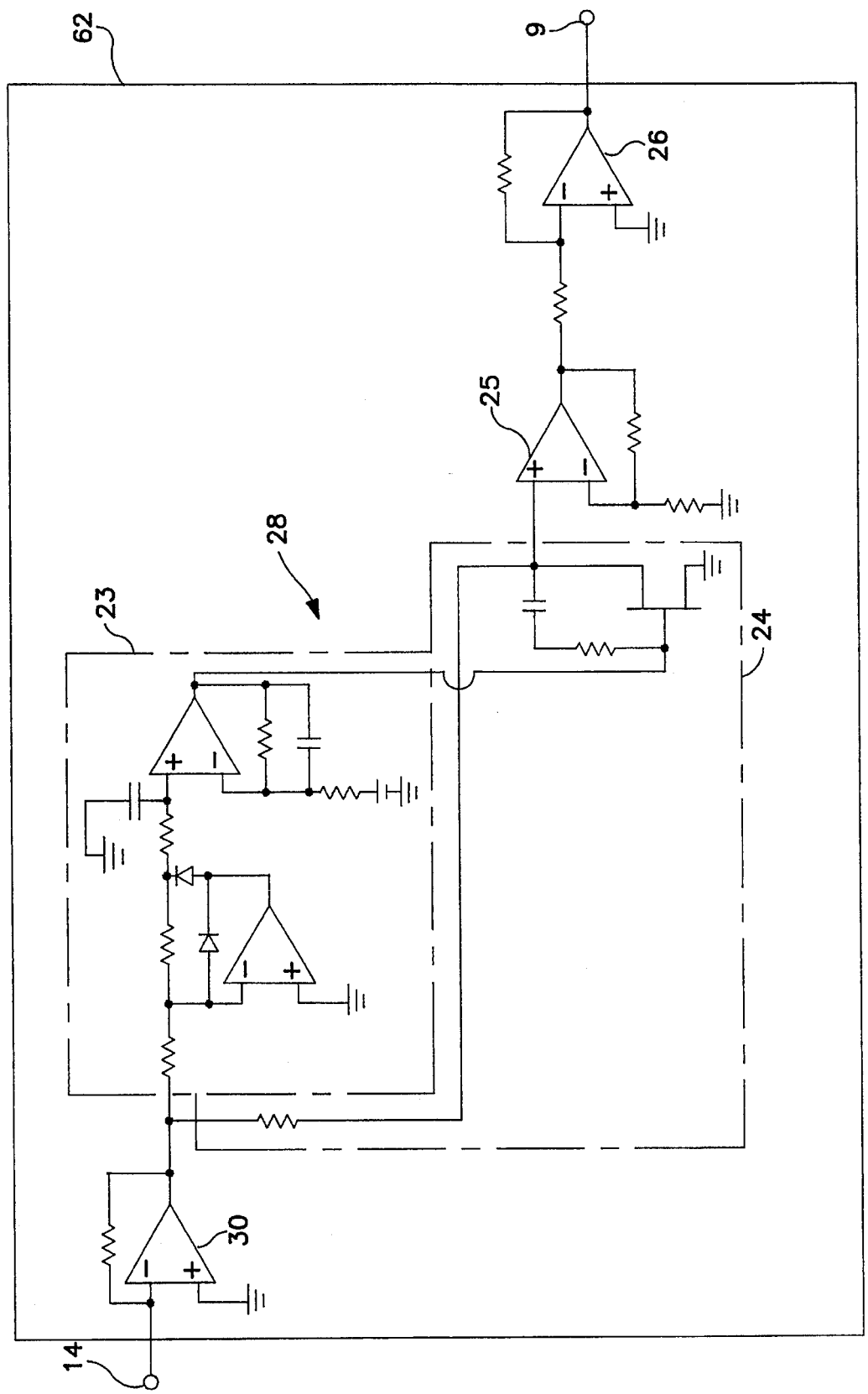
FIG. 10A illustrates an example of the drive apparatus shown in FIG. 9.

FIG. 10A illustrates an example of drive apparatus 62 as shown in FIG. 9. This drive apparatus 62 is similar to FIG. 2, except that it provides an inverting amplifier 30 before comparator 23 and the signal supplied at input terminal 14 is inverted and supplied to comparator 23. In other words, while the feedback signal sent to the input terminal of the drive apparatus in the previous example had its phase inverted relative to the input signal by the output of integrating amplifier 17, here the feedback signal inputted to input terminal 14 of drive apparatus 62 is a combined signal of the outputs of feedback amplifiers 10L and 10R and is in-phase with the drive signal. Therefore, the feedback signal is inverted by inverting amplifier 30 and supplied to comparator 23.

In this example, the output of feedback amplifiers 10L and 10R is a voltage which is the product of the currents flowing through piezo-electric elements 2 and 3 and the corresponding feedback resistances $Rf_L$ and $Rf_R$. The voltage corresponds to the combined current flowing through piezo-electric elements 2 and 3. Consequently, when the amplitude of the drive signal outputted at drive apparatus 62 having AGC circuit 28 is controlled, so that the voltage is fixed, the equivalent resistances for vibration in the sensitivity direction of vibrator 4 formed of the same piezo-electric elements 2 and 3 can be held apparently fixed regardless of changes in ambient temperature. Therefore, detection sensitivity to input angular velocity can be fixed and the angular velocity can be detected at high accuracy in the same manner as in Example 1. FIG. 10B illustrates an alternative drive apparatus 62 having drive signal output circuit 29 as described for FIGS. 2B and 5B.

Figure 11:
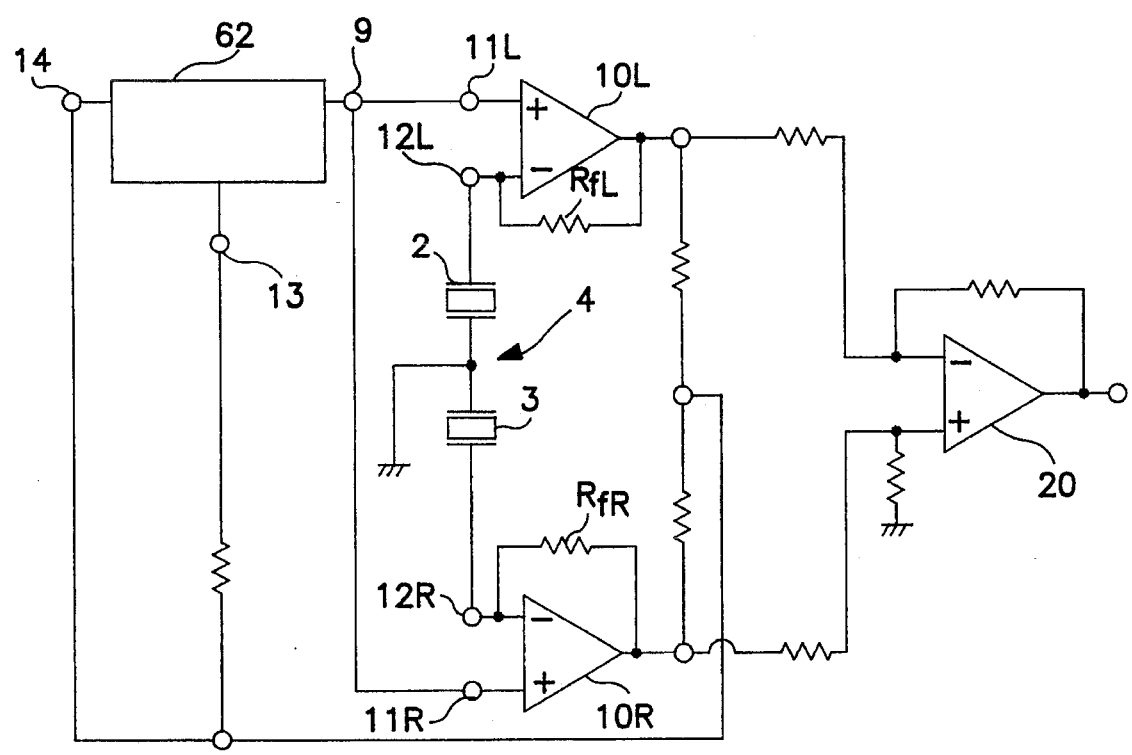
FIG. 11 illustrates an eighth example of the invention.

FIG. 11 illustrates Example 8 of the invention. In this example, drive apparatus 63 has compensation signal output terminal 13 that outputs the compensation signal of the damping capacity of vibrator 4. This compensation signal is combined with the outputs of feedback amplifiers 10L and 10R and is, thus, fed back to input terminal 14 of drive apparatus 63.

Figure 12A:
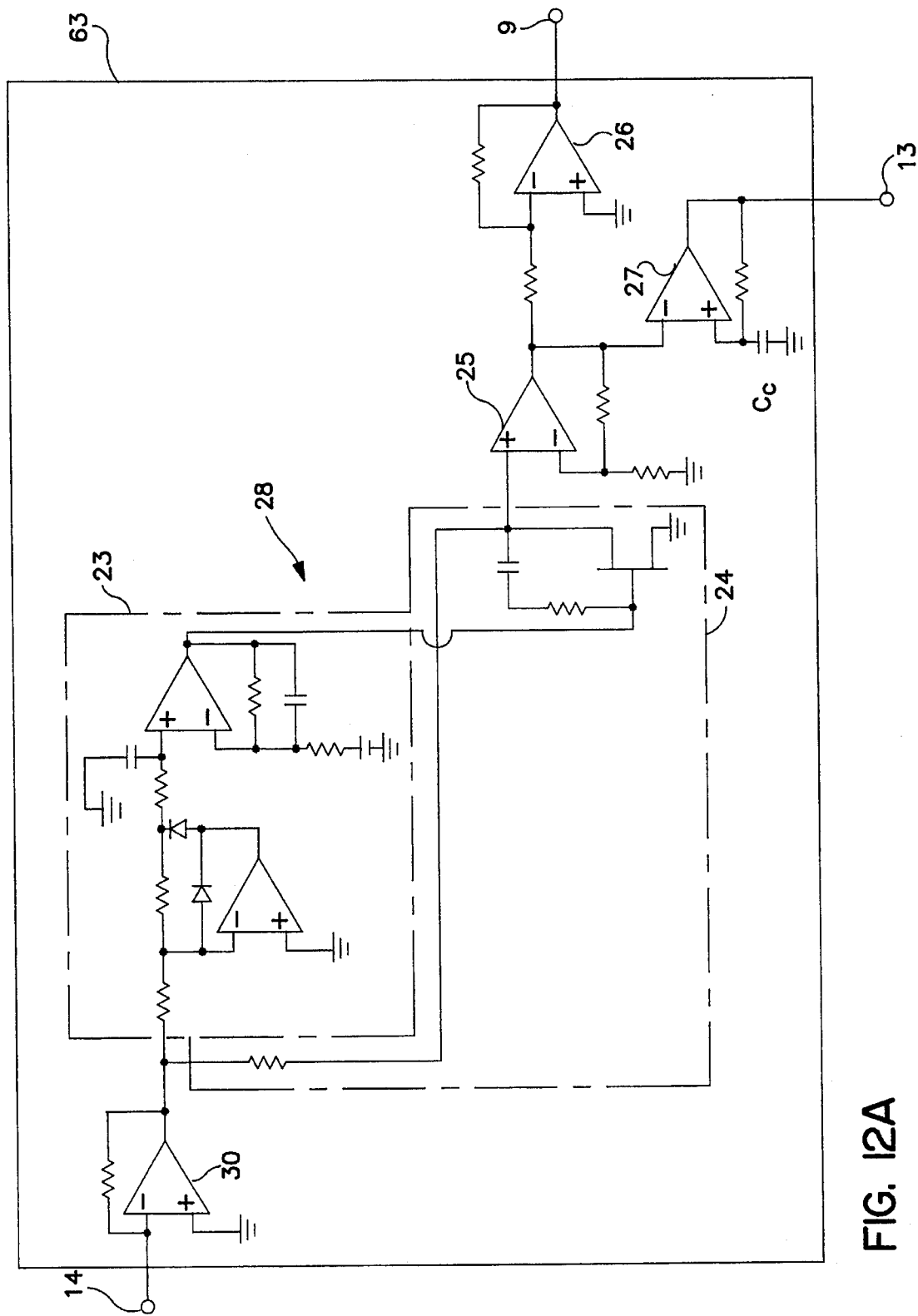
FIG. 12A illustrates an example of the drive apparatus shown in FIG. 11.
Figure 12B:
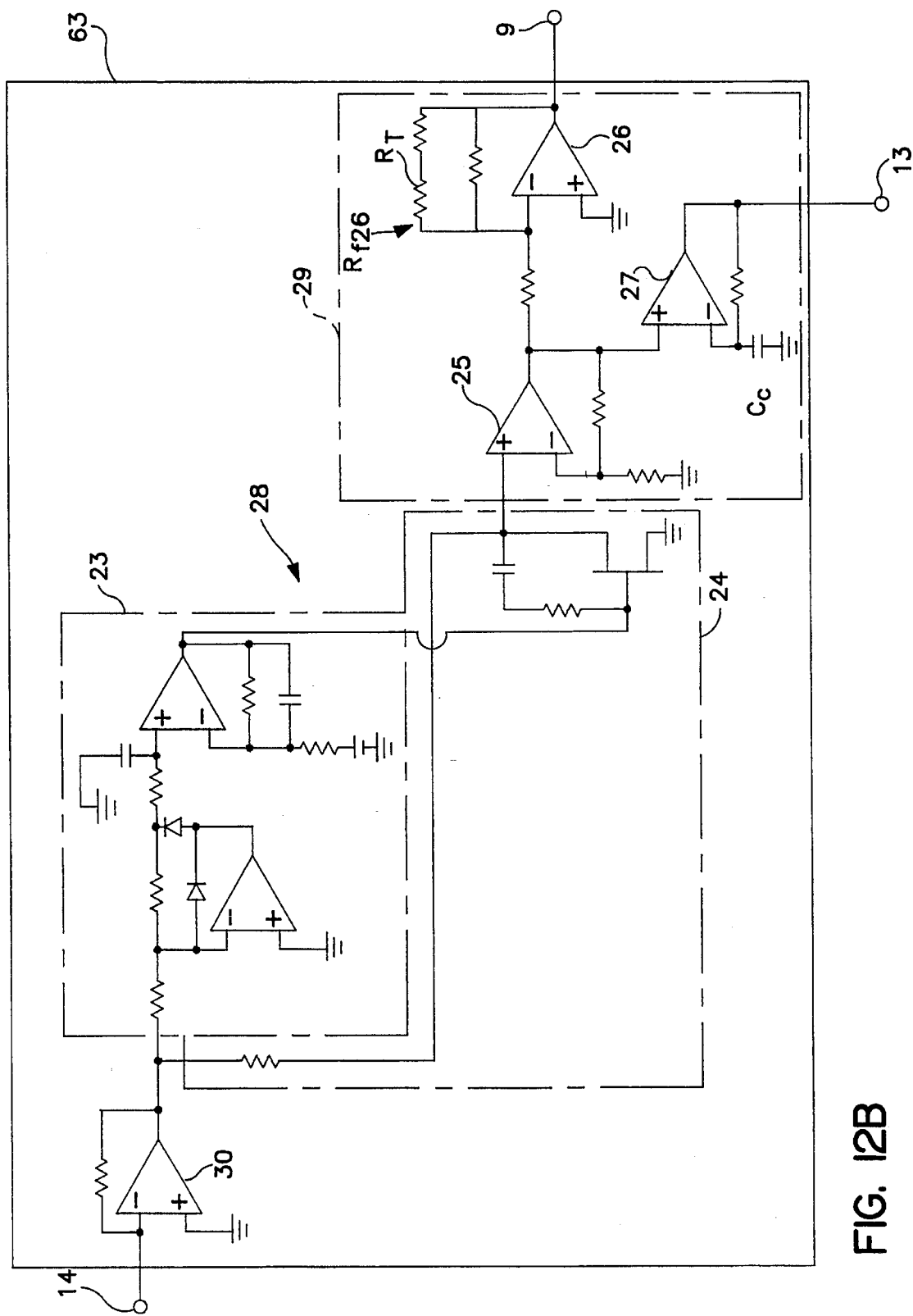
FIG. 12B illustrates an alternative example of the drive apparatus shown in FIG. 11.
Figure 13:
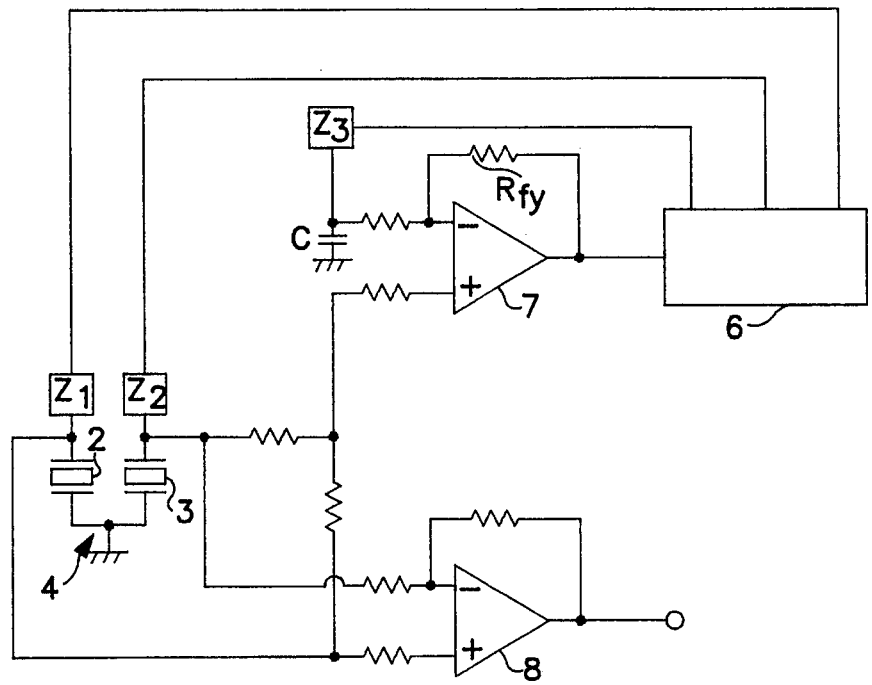
FIG. 13 illustrates a conventional vibration control apparatus.
Figure 14:
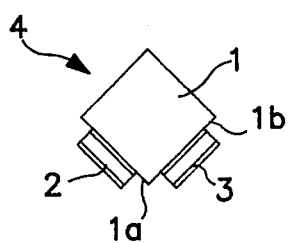
FIGS. 14 to 19 illustrate examples of vibrators that can be used with the invention.
Figure 15:
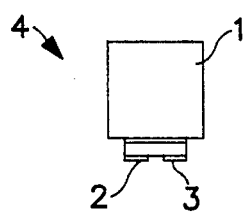
Figure 16:
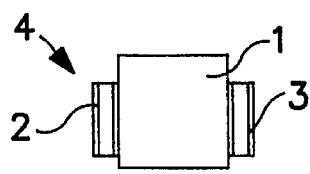
Figure 17:
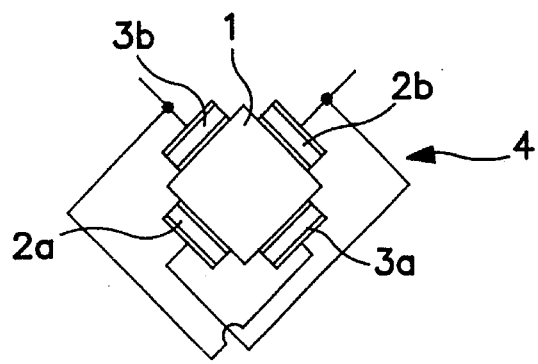
Figure 18:
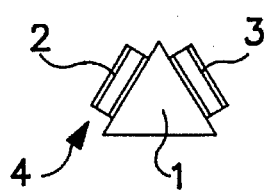
Figure 19:
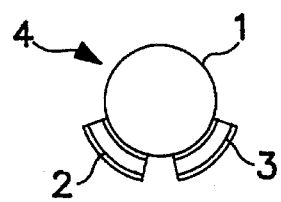
Figure 20:
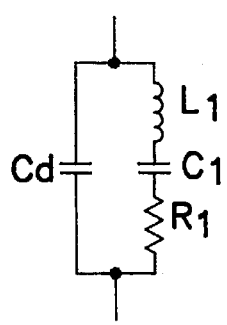
FIG. 20 illustrates an equivalent circuit of vibrator.
Figure 21:
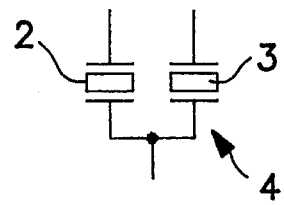
FIG. 21 illustrates the display of the vibrator.
Figure 22:
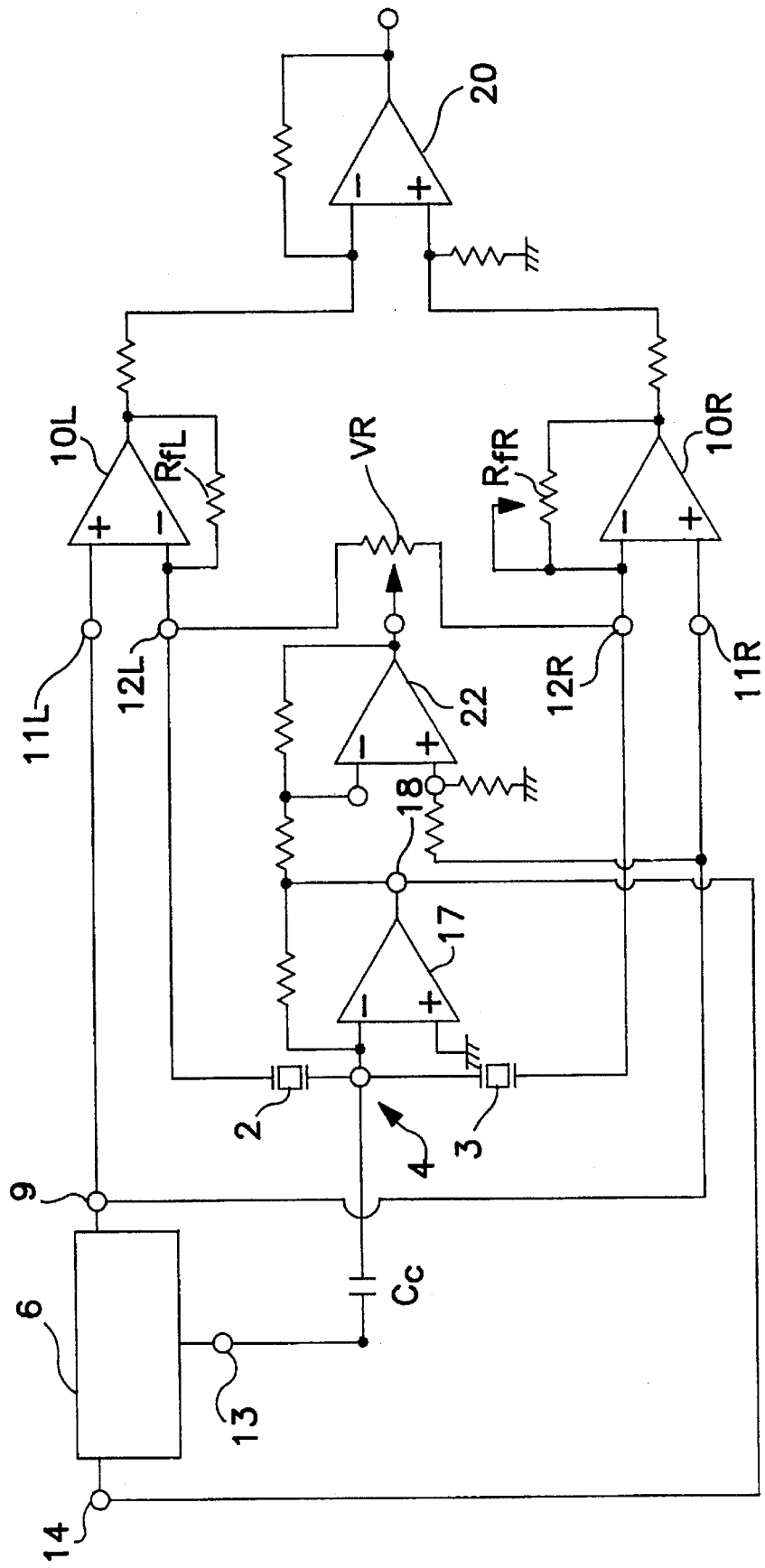
FIG. 22 illustrates an example of a vibration control apparatus disclosed by inventor in related patent applications.
Figure 23:
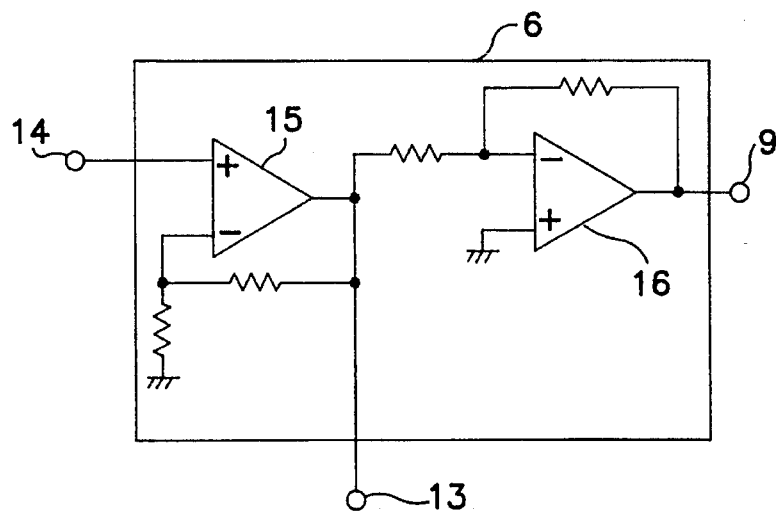
FIG. 23 illustrates an example of the drive apparatus shown in FIG. 22.

FIGS. 12A and B illustrate examples of the drive apparatus 63 shown in FIG. 11. This drive apparatus 63 is similar to the drive apparatus 62 shown in FIGS. 10A and B. However, besides adding feedback amplifier 27 and supplying the output of non-inverting amplifier 25 to inverting amplifier 26, drive apparatus 63 also supplies the non-inverting amplifier 25 output to the non-inverting input terminal of feedback amplifier 27. Capacitor Cc is connected to the inverting input terminal of the feedback amplifier 27. The output of feedback amplifier 27 is supplied as a compensation signal to compensation signal output terminal 13. In other words, the drive signal output from signal output terminal 9 and the compensation signal output at compensation output terminal 13 differ in phase by 180° and their amplitude ratio is suitably set by inversion amplifier 26.

Alternatively, as shown in FIG. 10B, the drive apparatus may have drive signal output circuit 29 with a feedback resistor $Rf_{26}$ and a thermistor $R_T$, as described above.

In this example, the feedback signal supplied to input terminal 14 has an imaginary part of the currents flowing in piezo-electric elements 2 and 3, relative to the respective damping capacities Cd. The imaginary part of the current is extinguished by the compensation current combined via capacitor Cc. Therefore, only the real number part of the currents flows in piezo-electric elements 2 and 3. Consequently, it is possible to impart self-induced vibration by stabilizing vibrator 4 at a frequency that is in accurate agreement with its mechanical series resonance frequency $f_s$. The self-induced vibration at mechanical series resonance frequency $f_s$ can be further stabilized by using a capacitor Cc having a temperature dependence corresponding to the temperature dependence of damping capacities Cd of vibrator 4.

Also, in drive apparatus 63 the amplitude of the drive signal sent to signal output terminal 9 is controlled by the AGC circuit 28 and the level of the feedback signal supplied to its input terminal 14 is fixed. Therefore, the equivalent resistances for vibration in the sensitivity direction of vibrator 4, having the same piezo-electric elements 2 and 3, are held apparently fixed regardless of changes in ambient temperature. Consequently, detection sensitivity to input angular velocity is fixed and it is possible to detect the angular velocity at high accuracy.

As described above, in the first embodiment of the invention, the combined current value of the currents flowing through a pair of piezo-electric elements is held fixed, thereby making it possible to hold the equivalent resistances of the vibrator apparently fixed regardless of ambient temperature changes. Consequently, the vibrator can be imparted self-induced vibration at a constantly fixed amplitude. When used with a vibrating gyroscope that detects angular velocity using the same pair of piezo-electric elements, it is possible to fix the detection sensitivity in the self-induced vibration direction and the orthogonal direction regardless of changes in ambient temperature. It is also possible to detect input angular velocity constantly at high accuracy.

In the second embodiment of the invention, the combined current comprising- the currents flowing through a pair of piezo-electric elements and the current corresponding to the damping capacities subtracted, i.e., the real number part of the combined current, is held fixed, so that the equivalent resistances of the vibrator can be held apparently fixed regardless of ambient temperature changes. Consequently, the vibrator is given a more accurate self-induced vibration at a constantly fixed amplitude. When used with a vibration gyroscope that detects angular velocity using the same pair of piezo-electric elements, it is possible to fix the detection sensitivity in the self-induced vibration direction and the orthogonal direction more accurately regardless of changes in ambient temperature. It is also possible to detect input angular velocity at still higher accuracy.

As described above, in the third embodiment of the invention the combined current value of the currents flowing through a pair of piezo-electric elements is held fixed by an AGC circuit. The voltage gain of the drive signal output circuit has a temperature dependence corresponding to the temperature dependence of the equivalent resistances of the vibrator. As a result, the AGC circuit has sufficient surplus even under changes in ambient temperature. Changes in current flowing in the vibrator are suppressed. It is possible to hold equivalent resistances of the AGC circuit apparently fixed. Consequently, the vibrator can be given stabilized self-induced vibration with no changes in amplitude. When used with a vibrating gyroscope that detects angular velocity using the same pair of piezo-electric elements, it is possible to raise detection accuracy without temperature dependence of detection sensitivity relative to input angular velocity.

In the fourth embodiment of the invention, the combined current value of the currents flowing through a pair of piezo-electric elements with current corresponding to the damping capacities subtracted, i.e., the real part of the combined current, is held fixed by the AGC circuit. At the same time, a temperature dependence that differs from the temperature dependence of the damping capacities of the vibrator is imparted to the voltage gain of the drive signal output circuit, so that a sufficient surplus is given to the AGC circuit despite changes in ambient temperature. Changes in current flowing in the vibrator are suppressed. It is possible to hold the equivalent resistances apparently fixed. Consequently, the vibrator can be given stabilized self-induced vibration with no changes in amplitude. When used with a vibrating gyroscope that detects angular velocity using the same pair of piezo-electric elements, it is possible to raise detection accuracy without temperature dependence of detection sensitivity relative to input angular velocity.

Finally, the above described embodiments of the present invention are intended to be illustrative only. Numerous alternative embodiments may be devised by those skilled in the art without departing from the spirit and scope of the following claims.

I claim:

1. Vibration control apparatus comprising,
    (a) a vibrator having a vibration member having at least one side surface with a resonance point,
    (b) first and second piezoelectric elements on said at least one side surface, each piezoelectric element having at least first and second electrodes,
    (c) a drive apparatus having a signal output terminal that outputs a drive signal of the vibrator, and a signal input terminal;
    (d) first and second feedback amplifiers, each having a feedback input terminal, and a signal input terminal;
    wherein each respective signal input terminal of said first and second feedback amplifiers is connected to said signal output terminal of said drive apparatus, the feedback input terminal of said first feedback amplifier is connected to said first electrode of said first piezoelectric element, the feedback input terminal of said second feedback amplifier is connected to said first electrode of said second piezoelectric element, said second electrodes of said first and second piezoelectric elements are connected to said signal input terminal of said drive apparatus, and
    wherein said drive apparatus further comprises an automatic gain control circuit which holds fixed a combined current value of respective currents flowing through said second electrodes.

2. The vibration control apparatus of claim 1, wherein said automatic gain control circuit comprises a comparator and a vibration controller, said vibration controller controlling the amplitude of a signal received from said input terminal of said drive apparatus based on the output of said comparator.

3. The vibration control apparatus of claim 2, wherein said drive apparatus further comprises a drive signal output circuit the output of which varies according to the temperature dependencies of equivalent resistances of said vibrator.

4. The vibration control apparatus of claim 3, wherein said drive signal output circuit comprises an inverting amplifier that contains a negative characteristic thermistor having the temperature dependence of the equivalent resistances of said vibrator.

5. Vibration control apparatus comprising,
   (a) a vibrator having a vibration member having at least one side surface with a resonance point,
   (b) first and second piezoelectric elements on said at least one side surface, each piezoelectric element having at least first and second electrodes,
   (c) a drive apparatus having a signal output terminal that outputs a drive signal of the vibrator, a compensation signal output terminal that outputs a compensation signal of damping capacity of said vibrator, and a signal input terminal,
   (d) first and second feedback amplifiers, each having a feedback input terminal, and a signal input terminal;
   wherein each respective signal input terminal of said first and second feedback amplifiers is connected to said signal output terminal of said drive apparatus, the feedback input terminal of said first feedback amplifier is connected to said first electrode of said first piezoelectric element, the feedback input terminal of said second feedback amplifier is connected to said first electrode of said second piezoelectric element, said second electrodes of said first and second piezoelectric elements are connected to said signal input terminal and said compensation signal output terminal of said drive apparatus, and
   wherein said drive apparatus further comprises an automatic gain control circuit which holds fixed a combined current value of respective currents flowing through said second electrodes from which current corresponding to a damping capacity has been subtracted.

6. The vibration control apparatus of claim 5, wherein said automatic gain control circuit comprises a comparator and a vibration controller, said vibration controller controlling the amplitude of the signal received from said input terminal of said drive apparatus based on the output of said comparator.

7. The vibration control apparatus of claim 6, wherein said drive apparatus further comprises a drive signal output circuit the output of which varies according to the temperature dependencies of equivalent resistances of said vibrator.

8. The vibration control apparatus of claim 7, wherein said drive signal output circuit comprises an inverting amplifier that contains a negative characteristic thermistor having the temperature dependence of the equivalent resistances of said vibrator.

9. The vibration control apparatus of claim 5, wherein said compensation signal output terminal of said drive apparatus and said respective second electrode of said first and second piezoelectric elements are connected through a capacitor for extinguishing the imaginary pans of the currents flowing in said first and second piezoelectric elements.

10. Vibration control apparatus comprising,
    (a) a vibrator having a vibration member having at least one side surface with a resonance point,
    (b) first and second piezoelectric elements on said at least one side surface, each piezoelectric element having at least first and second electrodes,
    (c) a drive apparatus having a signal output terminal that outputs a drive signal of the vibrator, and a signal input terminal,
    (d) first and second feedback amplifiers, each having a feedback input terminal, a signal input terminal, and a signal output terminal;
    wherein each respective signal input terminal of said first and second feedback amplifier is connected to said signal output terminal of said drive apparatus, the feedback input terminal of said first feedback amplifier is connected to said first electrode of said first piezoelectric element, the feedback input terminal of said second feedback amplifier is connected to said first electrode of said second piezoelectric element, said second electrodes of said first and second piezoelectric elements are connected to ground potential, and said respective signal output terminal of said first and second feedback amplifiers are connected to said input terminal of said drive apparatus, and
    wherein said drive apparatus further comprises an automatic gain control circuit which holds fixed a combined current value of respective currents flowing through said second electrodes.

11. The vibration control apparatus of claim 10, wherein said automatic gain control circuit comprises a comparator and a vibration controller, said vibration controller controlling the amplitude of the signal received from said input terminal of said drive apparatus based on the output of said comparator.

12. The vibration control apparatus of claim 11, wherein said drive apparatus further comprises a drive signal output circuit the output of which varies according to the temperature dependencies of equivalent resistances of said vibrator.

13. The vibration control apparatus of claim 12, wherein said drive signal output circuit comprises an inverting amplifier that contains a negative characteristic thermistor having the temperature dependence of the equivalent resistances of said vibrator.

14. Vibration control apparatus comprising,
    (a) a vibrator having a vibration member having at least one side surface with a resonance point,
    (b) first and second piezoelectric elements on said at least one side surface, each piezoelectric element having at least first and second electrodes,
    (c) a drive apparatus having a signal output terminal that outputs a drive signal of the vibrator, a compensation signal output terminal that outputs a compensation signal of damping capacity of said vibrator, and a signal input terminal,
    (d) first and second feedback amplifiers, each having a feedback input terminal, a signal input terminal, and a signal output terminal;
    wherein each respective signal input terminal of said first and second feedback amplifiers is connected to said signal output terminal of said drive apparatus, the feedback input terminal of said first feedback amplifier is connected to said first electrode of said first piezoelectric element, the feedback input terminal of said second feedback amplifier is connected to said first electrode of said second piezoelectric element, said second electrodes of said first and second piezoelectric elements are connected to ground potential, and said signal output terminal of said feedback amplifier is connected to said signal input terminal and said compensation signal output terminal of said drive apparatus, and
    wherein said drive apparatus further comprises an automatic gain control circuit which holds fixed a combined current value of respective currents flowing through said second electrodes from which current corresponding to a damping capacity has been subtracted.

15. The vibration control apparatus of claim 14, wherein said automatic gain control circuit comprises a comparator and a vibration controller, said vibration controller controlling the amplitude of the signal received from said input terminal of said drive apparatus based on the output of said comparator.

16. The vibration control apparatus of claim 15, wherein said drive apparatus further comprises a capacitor for generating said compensation signal at said compensation signal output terminal of said drive apparatus.

17. The vibration control apparatus of claim 16, wherein said drive apparatus further comprises a drive signal output circuit the output of which varies according to the temperature dependencies of equivalent resistances of said vibrator.

18. The vibration control apparatus of claim 17, wherein said drive signal output circuit comprises an inverting amplifier that contains a negative characteristic thermistor having the temperature dependence of the equivalent resistance of said vibrator.

* * * * *